Figure 1:
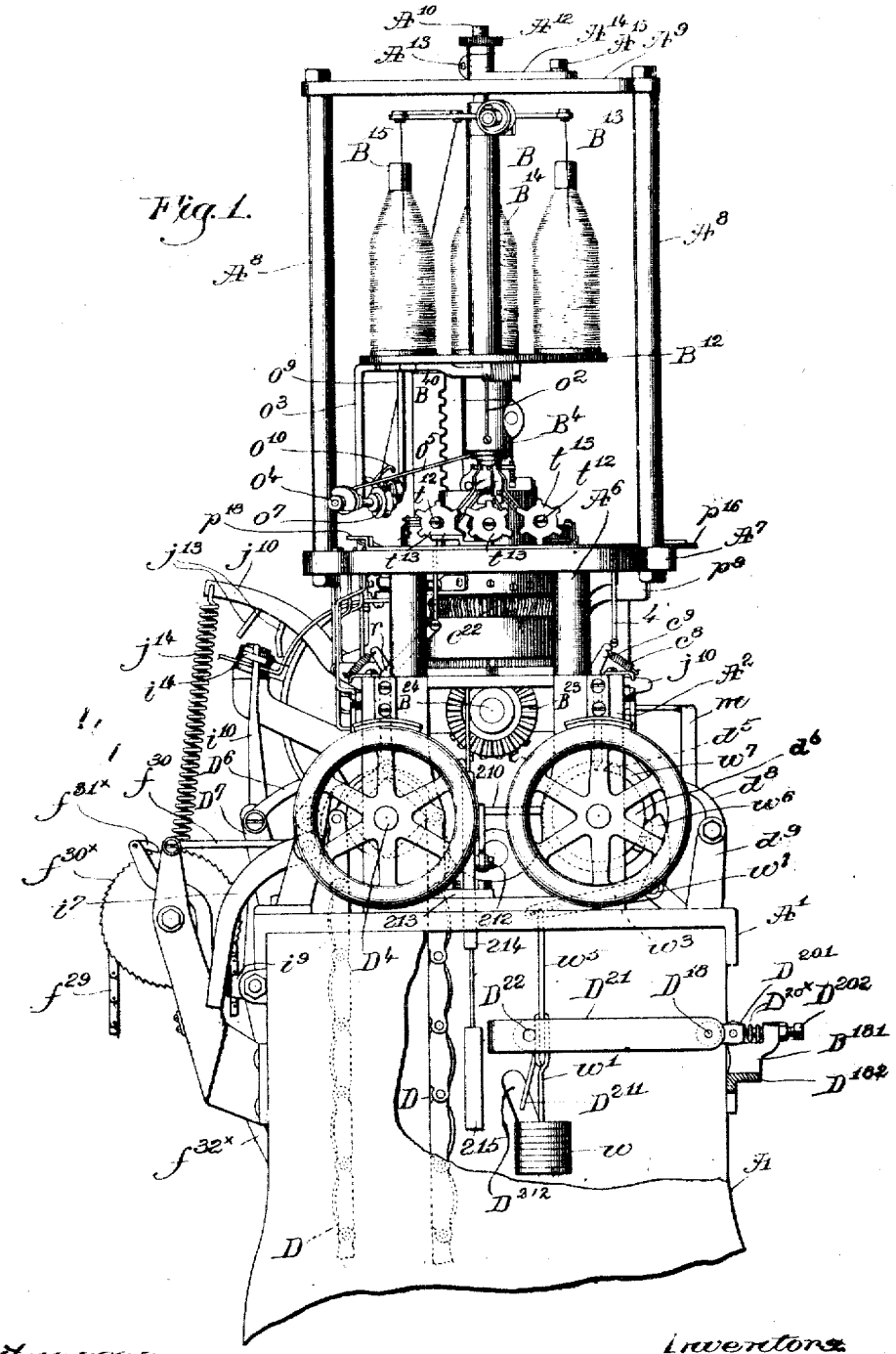

Reissued Feb. 9, 1909.

W. D. & L. C. HUSE.

KNITTING MACHINE.

APPLICATION FILED MAY 9, 1906

12,917.

10 SHEETS—SHEET 1.

Witnesses:

Thomas J. Drummond

Edward F. Allen

Inventors:

Warren D. Huse

Lucius C. Huse, by Busby, Duffy & Co.

Reissued Feb. 9, 1909.

W. D. & L. C. HUSE.

KNITTING MACHINE.

APPLICATION FILED MAY 9, 1906.

12,917.

10 SHEETS—SHEET 2.

Witnesses.

Thomas J. Drummond

Edward H. Allen.

Inventors.

Warren D. Huse

Leon C. Huse, by Dunlap & Gregory, Attys.

Reissued Feb. 9, 1909.

W. D. & L. C. HUSE.

KNITTING MACHINE.

APPLICATION FILED MAY 9, 1906.

12,917.

10 SHEETS—SHEET 3.

Witnesses:
Thomas J. Drummond
Edward F. Allen.

Inventors:
Warren D. Huse
Leon C. Huse.
by Crosby, Gregory & Allen.

Reissued Feb. 9, 1909

W. D. & L. C. HUSE.

KNITTING MACHINE.

APPLICATION FILED MAY 9, 1906

12,917.

10 SHEETS—SHEET 4.

Witnesses.
Thomas J. Drummond
Edward H. Allen.

Inventors.
Warren D. Huse
Leon C. Huse,
by Crosby Gregory, Attys.

Reissued Feb. 9, 1909.

W. D. & L. C. HUSE.
KNITTING MACHINE.
APPLICATION FILED MAY 9, 1906.

12,917.

10 SHEETS—SHEET 5.

Witnesses:
Thomas J. Drummond
Edward G. Allen

Inventors.
Warren D. Huse,
Leon C. Huse,
by Crosby Gregory Attys.

Reissued Feb. 9, 1909

W. D. & L. C. HUSE.

KNITTING MACHINE.

APPLICATION FILED MAY 9, 1906.

12,917.

10 SHEETS—SHEET 6.

Witnesses:

Thomas J. Drummond

Edward H. Allen.

Inventors:

Warren D. Huse,

Leon C. Huse, by Crosby Gregory, Attys.

Reissued Feb. 9, 1909.

W. D. & L. C. HUSE.
KNITTING MACHINE.
APPLICATION FILED MAY 9, 1906.

12,917.

10 SHEETS—SHEET 7.

Witnesses.
Thomas J. Drummond
Edward H. Allen.

Inventors.
Warren D. Huse
Leon C. Huse,
by Crosby Gregory attys.

Reissued Feb. 9, 1909.

W. D. & L. C. HUSE.
KNITTING MACHINE.
APPLICATION FILED MAY 9, 1906.

12,917.

10 SHEETS—SHEET 8.

Witnesses:
Thomas J. Drummond.
Edward F. Allen.

Inventors.
Warren D. Huse
Leon C. Huse,
by Mowby Gregory Attys.

Reissued Feb. 9, 1909.

W. D. & L. C. HUSE.
KNITTING MACHINE.
APPLICATION FILED MAY 9, 1906.

12.917.

10 SHEETS—SHEET 9.

Witnesses.
Thomas J. Drummond
Edward G. Allen.

Inventors.
Warren D. Huse,
Leon C. Huse,
by Crosby Gregory, Attys.

Reissued Feb. 9. 1909.
W. D. & L. C. HUSE.
KNITTING MACHINE.
APPLICATION FILED MAY 9, 1906.
12,917.
10 SHEETS—SHEET 10
Fig. 17.
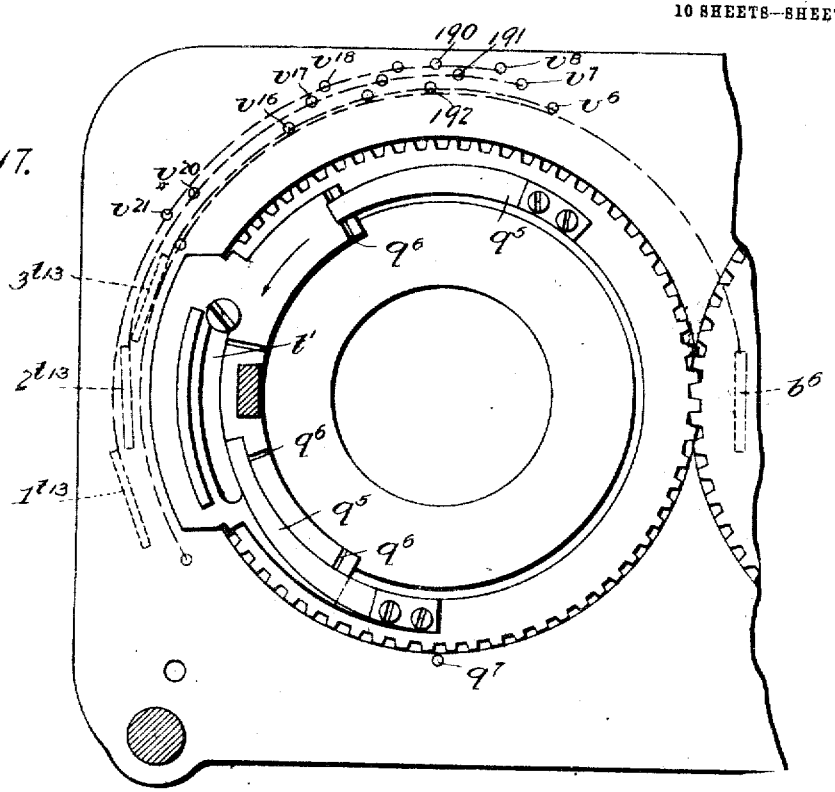
Fig. 20.
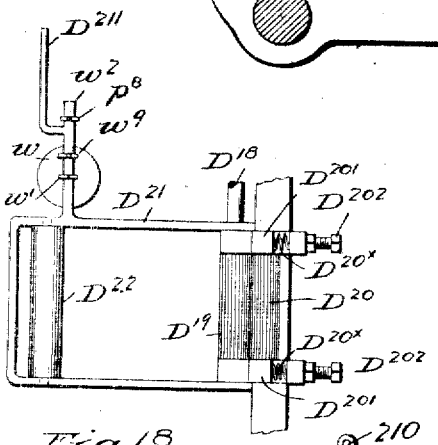
Fig. 18.
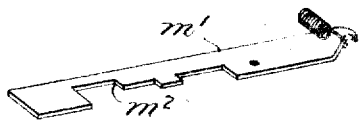
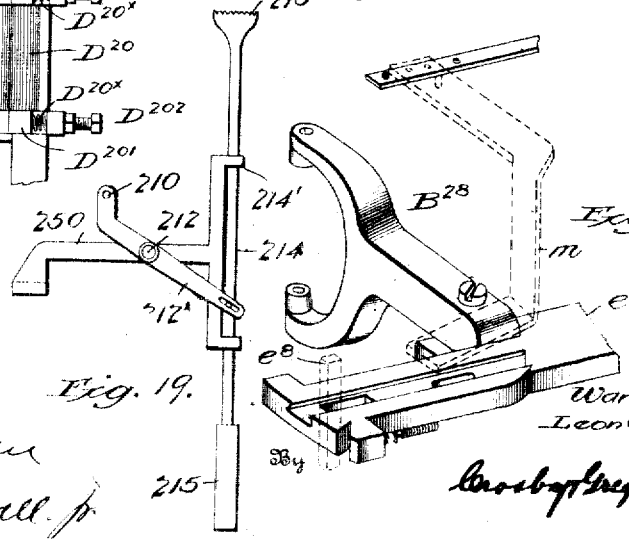
Fig. 19.
Fig. 21.
Witnesses
P. L. Mockeson
Edw. S. Dwall. Jr.
Inventors
Warren D. Huse
Leon C. Huse
By
Crosby & Gregory
Attorneys

UNITED STATES PATENT OFFICE.

WARREN D. HUSE AND LEON C. HUSE, OF LACONIA, NEW HAMPSHIRE, ASSIGNORS, BY MESNE ASSIGNMENTS, TO THE PARAMOUNT KNITTING COMPANY, A CORPORATION OF ILLINOIS.

KNITTING-MACHINE.

No. 12,917. Specification of Reissued Letters Patent. Reissued Feb. 9, 1909.

Original patent a continuation of application Serial No. 46,004, filed February 4, 1901. Original No. 904,484, dated November 17, 1908, Serial No. 315,901. Application for reissue filed November 21, 1908. Serial No. 463,840½.

*To all whom it may concern:*

Be it known that we, WARREN D. HUSE and LEON C. HUSE, citizens of the United States, and residents of Laconia, in the county of Belknap and State of New Hampshire, have invented an Improvement in Knitting-Machines, of which the following description, in connection with the accompanying drawing, is a specification, like letters on the drawings representing like parts.

The invention herein set forth has for its object the production of a complete automatic knitting machine primarily designed for the knitting of stockings.

The machine enables the complete article, such as a stocking, to be knit from one end to the other entirely automatically, so that all that is required is to keep the machine supplied with the proper yarns, to separate the stockings which come from the machine in a continuous web, and then to perform such simple operations as the stitching or looping together of the opening left at the toe end.

The present invention it is believed combines in a single automatic machine all the various features necessary to make a commercial stocking with the ribbed leg with reinforced toe and heel portions of proper and proportionate weight throughout and of sightly appearance when finished and when worn.

The machine is adapted to make a stocking such as described in United States Patent No. 626,864, granted June 13, 1899, although the elasticity of the machine in the adjustments and timing and combinations of its various elements is such that the range and character of work capable of being performed by it automatically is by no means limited to the character of stocking set forth in the said patent, but the said patent is an excellent illustration of the character of work capable of being performed automatically upon this machine.

The stocking of the aforesaid patent is, save for the necessary closing seam of the toe, knit in one seamless web, with the toe, foot and heel portions formed of plain knitting, and the leg portion of ribbed knitting. Since in forming the ribbed leg more stitches are made in a course than are made in forming the plain circular portion of the foot, it will be seen, as explained in the said patent, that unless provisions were made to compensate for the increased number of stitches thus formed the ribbed leg would be too large and unsightly. The leg portion of the stocking is accordingly formed in said patent of a thread sufficiently finer than that used in the foot portion to compensate for the increased number of stitches, and the object of the invention of the said patent was a seamless stocking in which the foot portion was knit in plain stitch, the leg portion in rib stitch, and with the relative weights of the yarn in the ribbed leg and the plain foot in inverse ratio or proportion to the number of stitches in said ribbed leg and plain foot portions.

The machine of the present invention comprises among others the following features which enable it to respond to the requirements for the production of not only such stockings as described in the said patent, but also stockings and other work of varied character and construction: two sets of knitting needles, the one for the production of plain circular work and reciprocating work, the two combined for the production of ribbed work, and means for controlling the separate and conjoint operation of the said sets of needles, all from pattern mechanism, so that either plain circular, reciprocating, narrowing and widening, or ribbed knitting may be performed upon the machine at and during such periods as may be predetermined. Web-holders or sinkers for the set of needles for performing the plain and reciprocating work over which the thread is at times measured off, and which serve to hold down the knitted web especially during plain knitting. Take-up mechanism supported by the knitted web, additional weights for said take-up mechanism to increase its taking up effect, and means for automatically applying either said take-up mechanism, or said weights to said take-up mechanism, or said take-up mechanism and the weights at and during such periods as may be predetermined. Auxiliary take-up mechanism or grab mechanism for meeting the requirements occasioned in the taking up of the knitted web due to the occurrence of pouches, such as formed in knitting the heel and toe, and means for automatically putting said auxiliary take-up mechanism into operation at and during such periods as may be predetermined. Thread supplying mechanism with provisions for automatically changing, adding or omitting threads of desired weight or quality at predetermined times, whereby desired portions of the stocking may be reinforced or formed of thread of different character or quality. Mechanism for automatically controlling the length of the stitch and hence the elasticity or tension of the knitted web, whereby the shape of the stocking may be controlled. Mechanism for automatically changing at predetermined times the speed of the knitting machine to accommodate it to the character of knitting being performed thereon. These and other features of the invention, combined as set forth in the appended claims, constitute the invention and result in the production of a wide range and character of work.

In the machine herein illustrated as embodying the invention and which is designed for the production of complete seamless stockings the work is preferably commenced at the toe pouch. The active set of needles in narrowing and widening are supplied preferably with a coarse thread, the machine running at a comparatively slow speed as required in reciprocating work. Upon the completion of the toe pouch the thread is preferably changed to a finer quality, and the plain foot portion knit in complete circular courses, the speed of the machine being increased at the same time to a higher speed. When the heel pouch is reached the speed of the machine is decreased, a change of yarn preferably effected, and a heel pouch formed in the usual way by narrowing and widening. On completion of the heel pouch the plain circular knitting is resumed at high speed and a change of thread made, if desired, to constitute an ankle portion, if a plain ankle portion is desired. If the ribbed leg is to be formed directly on completion of the heel pouch then the dial needles are thrown into action, a change to a finer thread effected, the speed of the machine increased, and the size of the stitch adjusted to produce a ribbed leg of the requisite elasticity and weight. The entire operation throughout is automatic and continuous, and in fact upon the completion of the stocking the change is automatically effected to plain circular web to form a short connecting web between the end of one stocking and the toe of the succeeding stocking, so that the stockings are knit in one continuous web. It is to be understood, however, that the regulation, employment, timing and adjustment of all the mechanisms is such as to make the machine capable of performing a very great variety of work.

Figure 2:
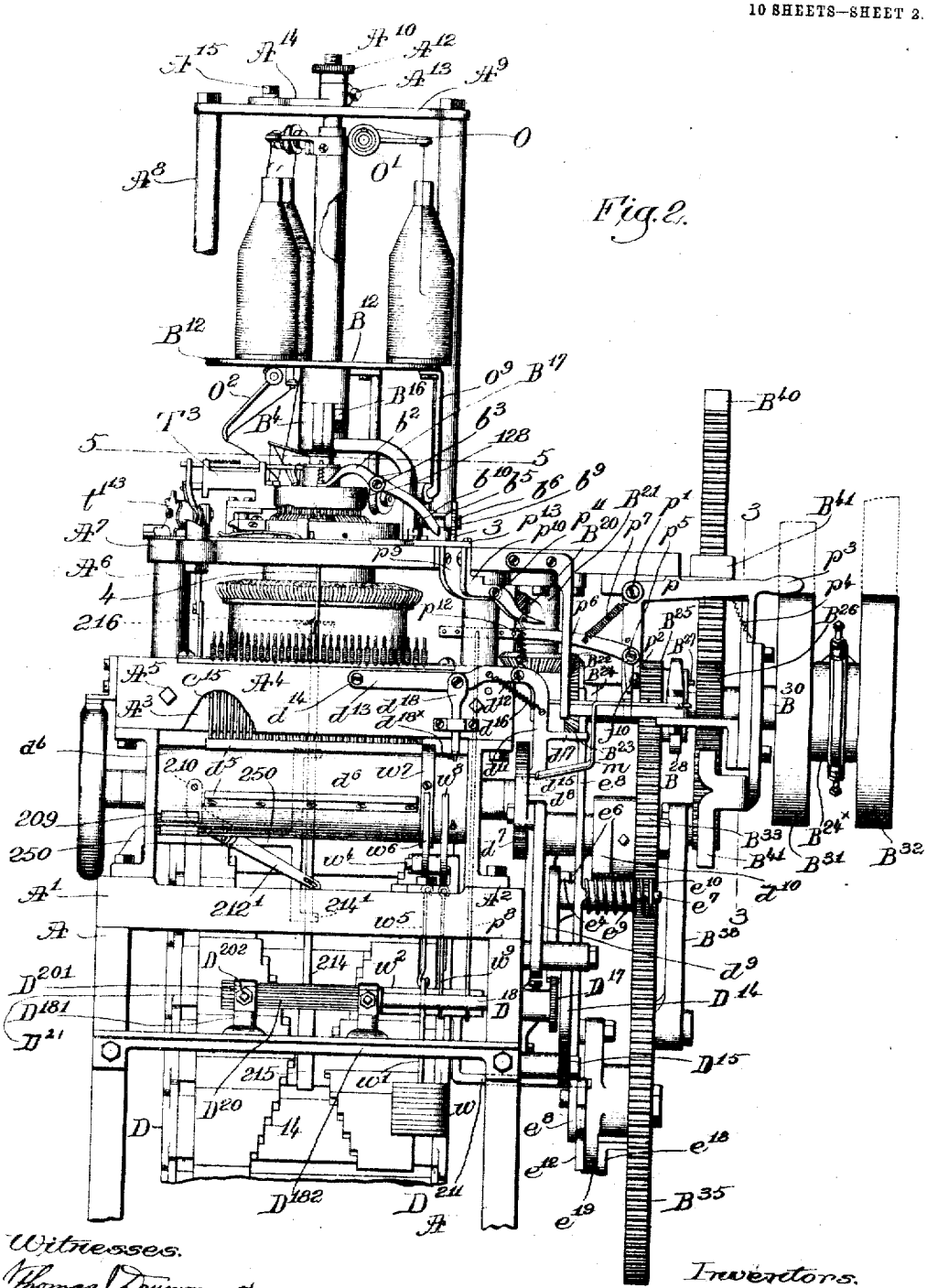
Figure 3:
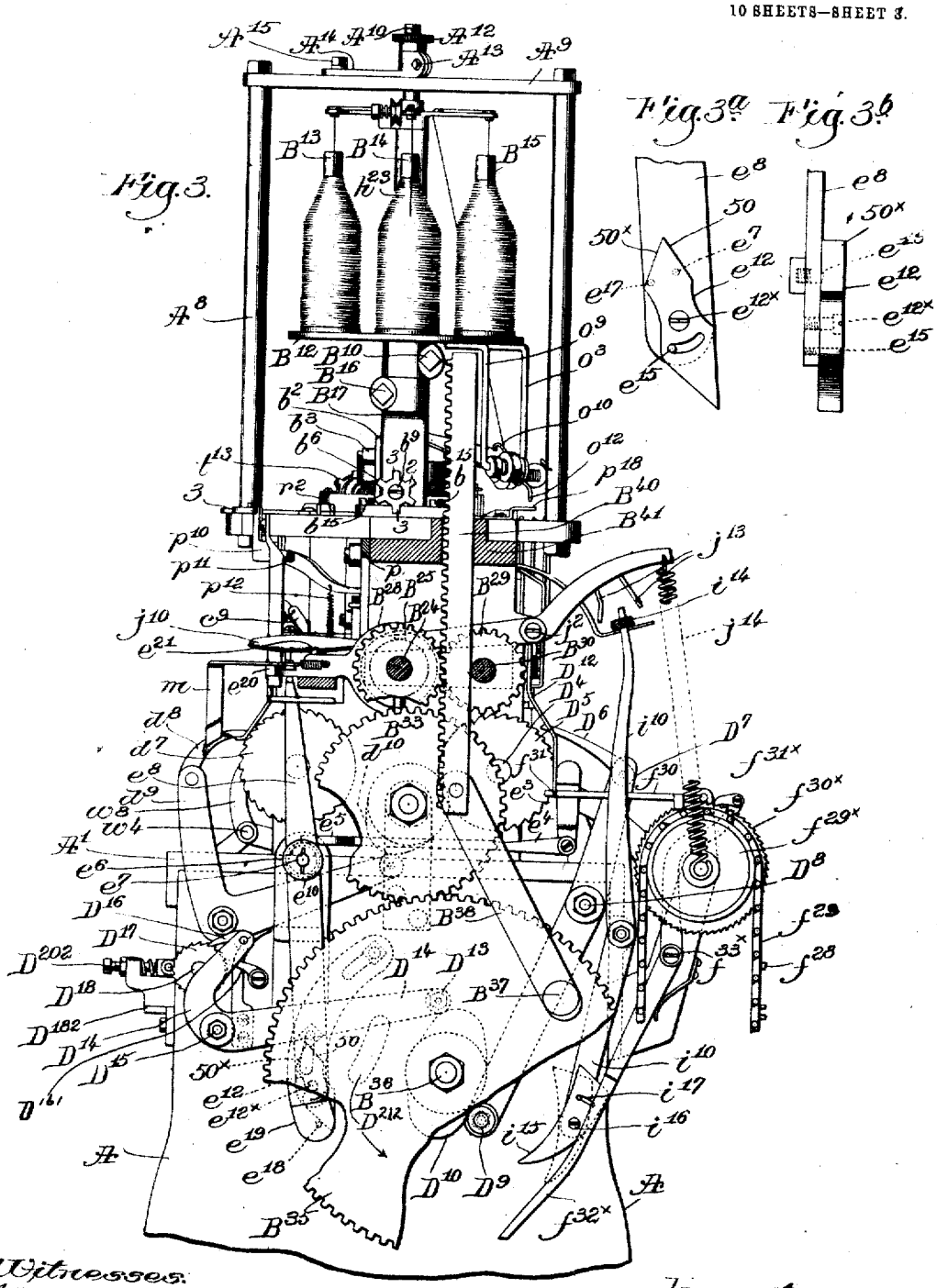
Figure 4:
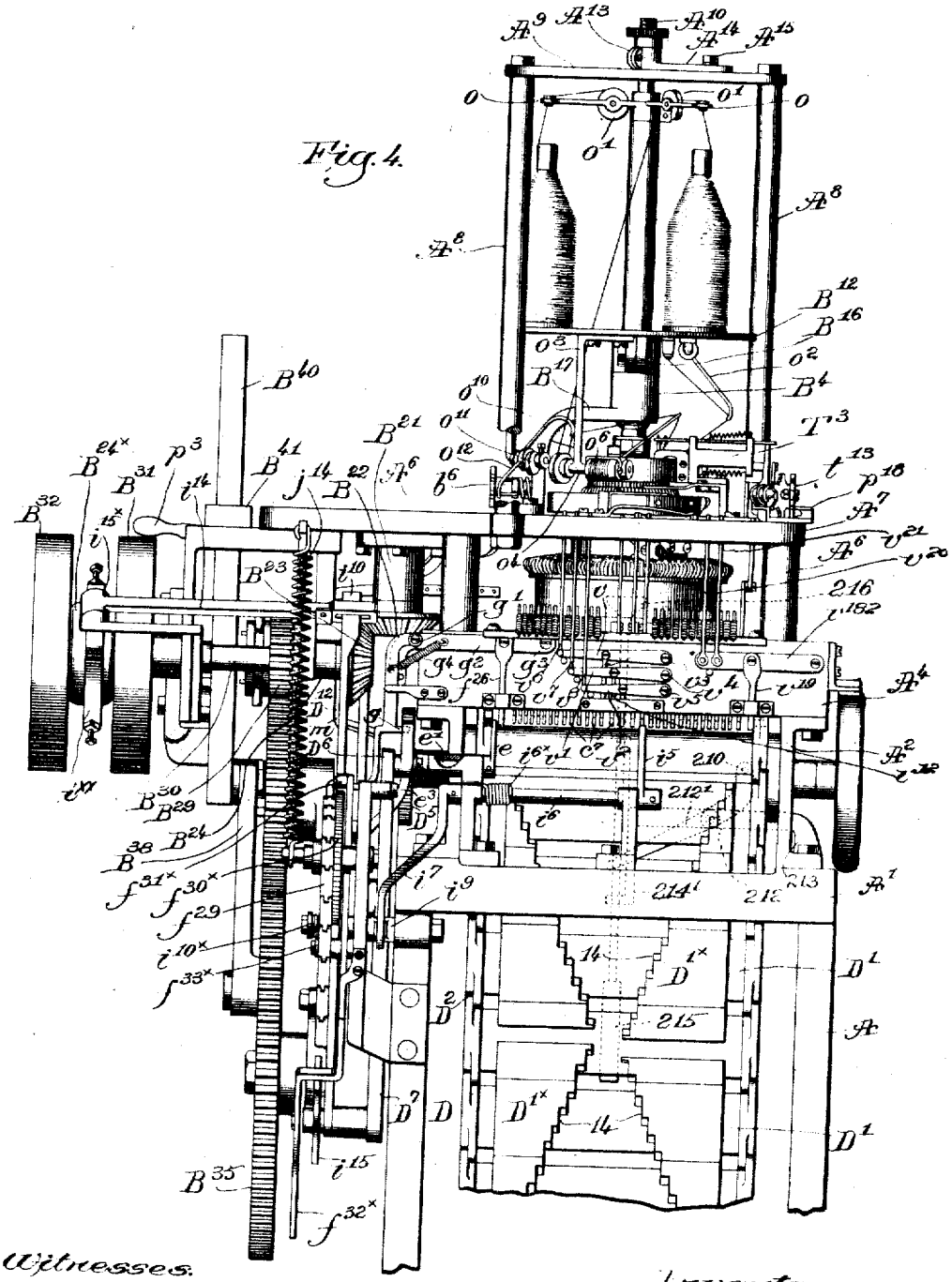
Figure 5:
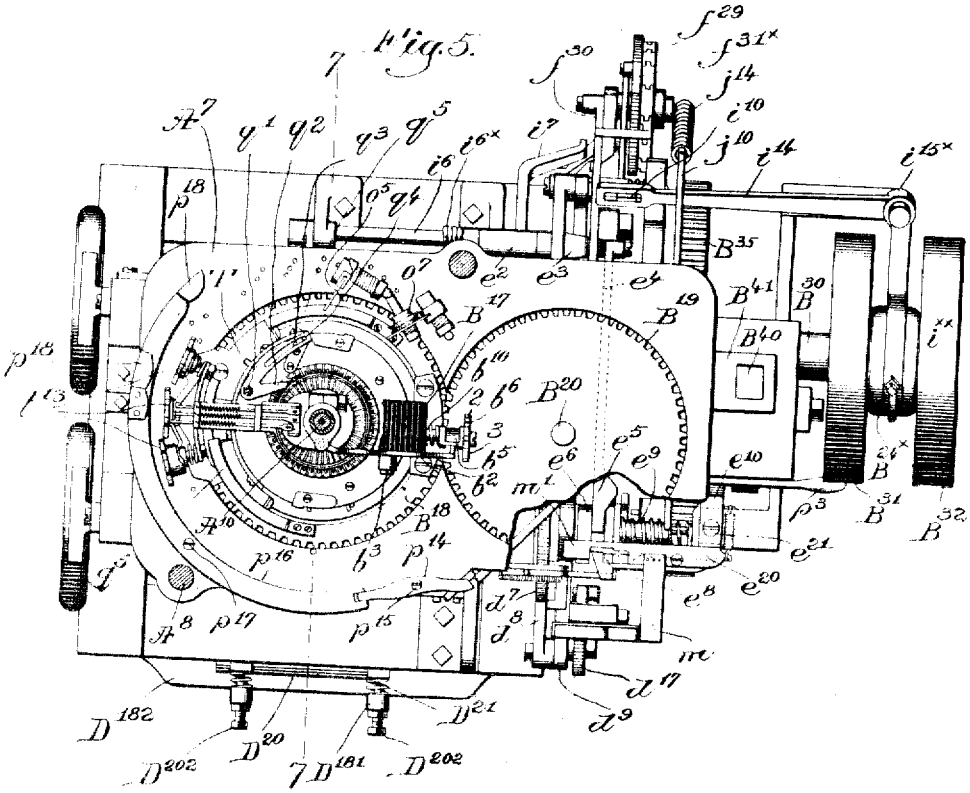
Figure 6:
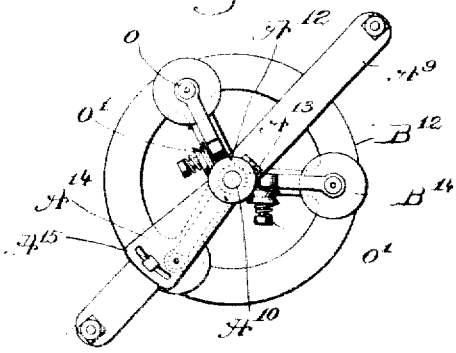
Figure 7:
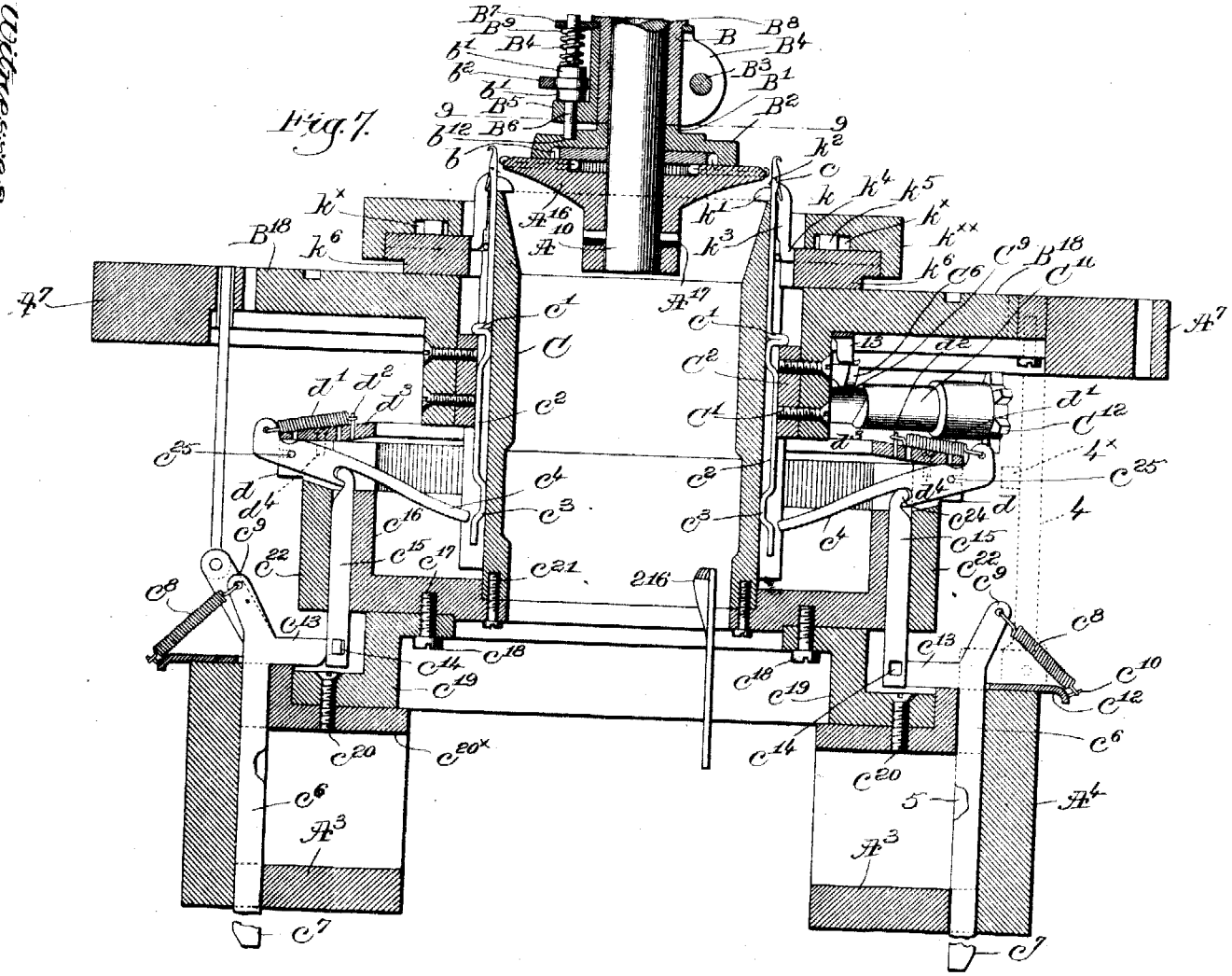
Figure 8:
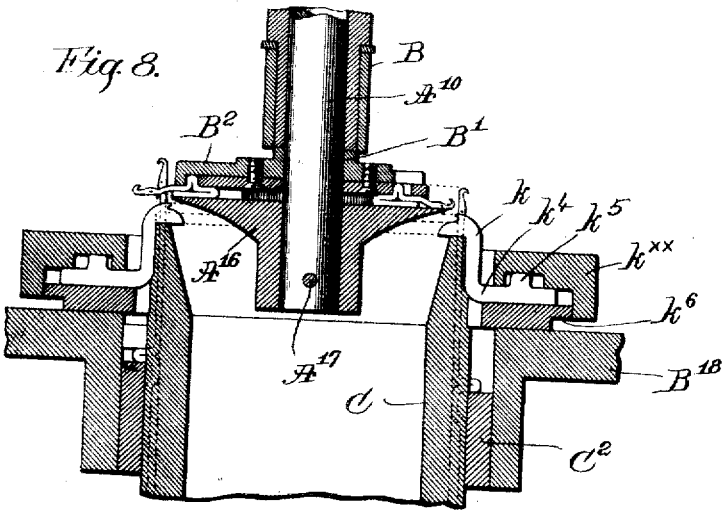
Figure 8A:
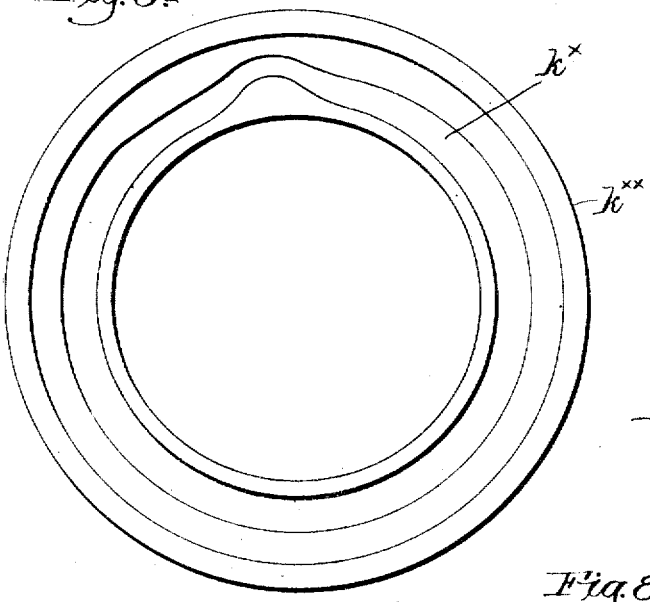
Figure 8B:
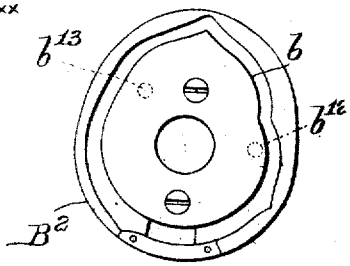
Figure 9:
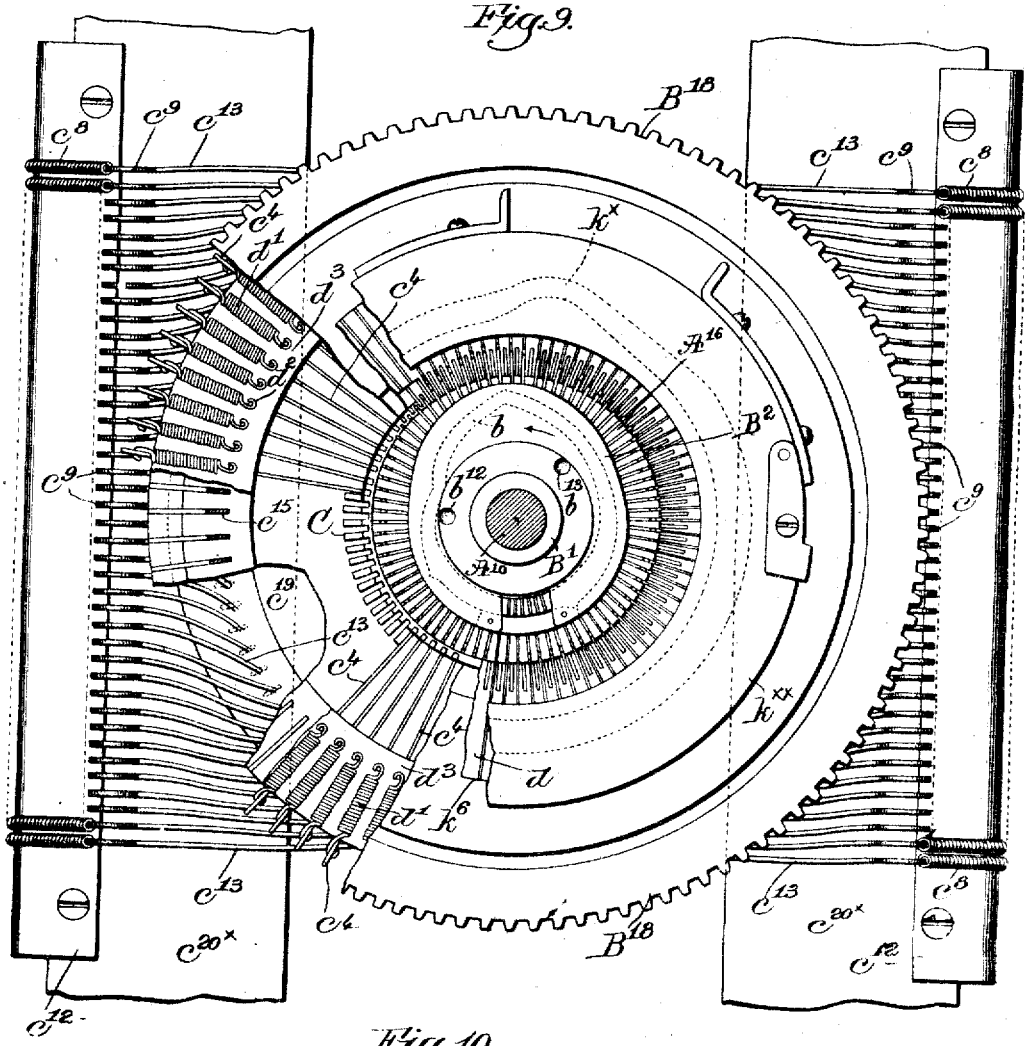
Figure 10:
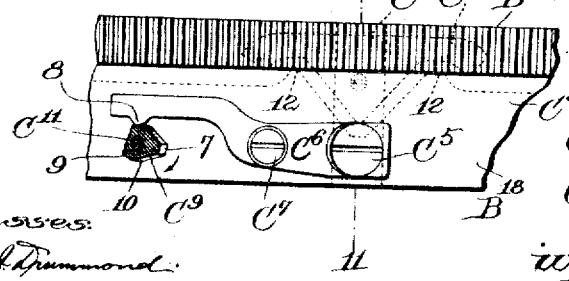
Figure 11:
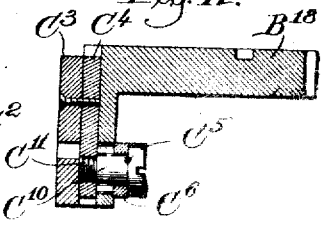
Figure 12:
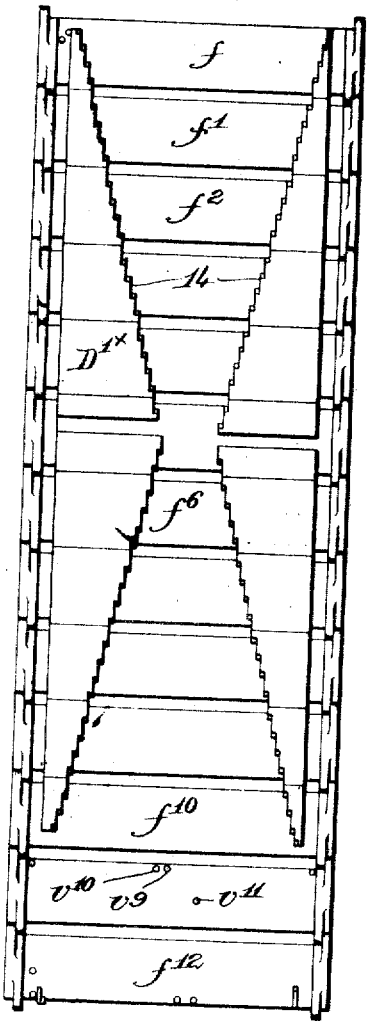
Figure 13:
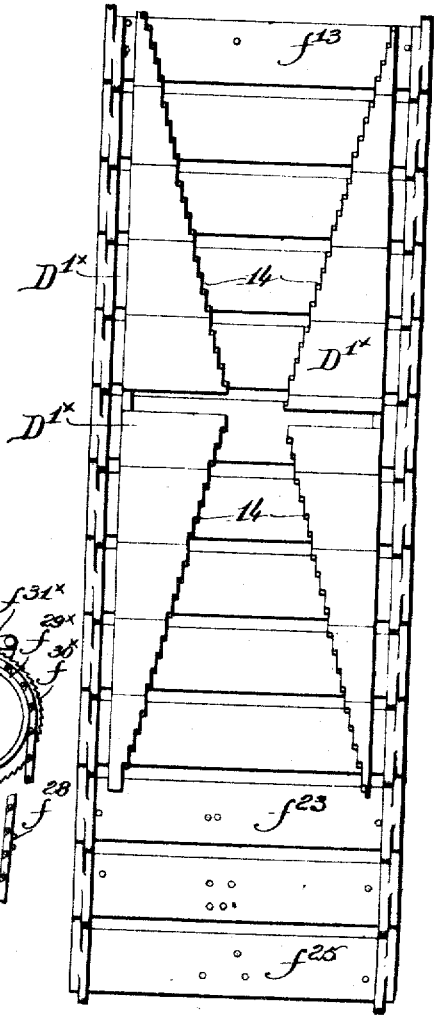
Figure 14:
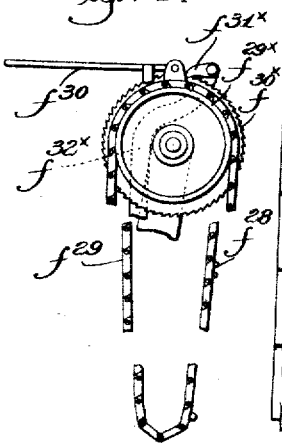
Figure 15:
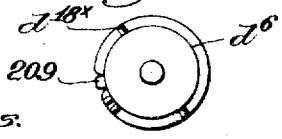
Figure 16:
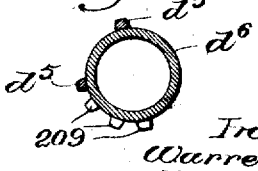

Figure 1, in left hand elevation, represents our improved machine, the lower part of the side frame and part of the pattern surface being omitted, the parts of the machine occupying that position in the formation of the stocking after the machine has laid two or three courses of rib knitting in the starting of the leg, the machine being supposed to be running at its fast speed and the cam cylinder to be revolving continuously in the same direction; Fig. 2 is a partial front elevation of said machine; Fig. 3 is a sectional elevation on line 3—3, Fig. 2, looking to the left; Figs. $3^a$ and $3^b$ are details in side and edge views of the switch lever $e^8$ and its connected switch to be described; Fig. 4 is a rear side elevation of the machine represented in Fig. 1; Fig. 5 is a top or plan view of the machine represented in Fig. 1 below the dotted line 5—5, Fig. 2; Fig. 6 is a top view of the upper part of the machine omitted from Fig. 5; Fig. 7 is an enlarged vertical section in substantially the line 7—7, Fig. 5, showing the stationary needle-cylinder, its needles, the cam-cylinder, devices for moving the needles into or out of position for toe or heel work, the dial-needle bed and the dial cam plate with its locking device and part of the grab, said section being in line wherein the dial needles are shown as retracted and the cylinder needles in their normal positions; Fig. 8 is a similar section but in a line substantially at right angles to the section in Fig. 7, said figure being made chiefly to represent the dial and cylinder needles in knitting position; Fig. $8^a$ is an underside view of the sinker actuating cam ring; Fig. $8^b$ is an underside view of the dial needle cam; Fig. $8^c$ shows a sinker detached; Fig. 9 is a section on the line 9—9, Fig. 7, some of the parts being broken out to better disclose parts lying underneath, the thread guides being entirely omitted; Fig. 10 is a detail showing the knitting cam of the cam cylinder together with a device for changing its position to govern the length of stitch; Fig. 11 is a section of Fig. 10 in the line 11—11; Fig. 12 is a detail showing thirteen of the twenty-five bars of the pattern surface, the bar $f$ being at the top and the bar $f^{12}$ at the bottom; Fig. 13 is a similar view of the remaining bars of the pattern surface, the bar $f^{13}$ being at the top, said two figures together representing the entire pattern surface laid out flat; Fig. 14 shows the controlling chain hanging on its sprocket wheel together with the various lumps carried by it to control the time of action and inaction of the pawl for imparting motion to the pattern surface, said chain being partially broken out; Fig. 15 represents a right-hand end view of the cylinder carrying the ribs for simultaneously putting out of action the needles which are not to be used in reciprocating knitting; Fig. 16 is a section of said cylinder; Fig. 17 is a detail in plain view, showing the movable stand for carrying the thread guides and holders or catchers, said figure also showing the pins for operating the cam wheels, the locking means for the stand and the pin for arresting the stand during reciprocating knitting; Fig. 18 is a top plan view of a portion of the take-up for controlling the circular knitted fabric; Fig. 19 is a portion of the take-up for controlling the fabric produced by reciprocating knitting; Figs. 20 and 21 show details of devices instrumental in changing the direction of movement of the cam cylinder for circular and reciprocating knitting and putting into and out of operation the pawl mechanism for moving one of the pattern cylinders.

The framework herein represented consists essentially of side plates A of suitable shape to stand upon the floor, said plates being connected at their upper end in suitable manner by a tie plate A′, it serving the purpose, in connection with other suitable legs, to keep the side plates in suitable position and also to support the working parts of the machine.

Erected upon the tie plate as herein represented, at its opposite sides are suitable stands $A^2$, which, in turn, support cross-bars or beams $A^3$, each provided at its outer face with a series of vertical grooves for the reception of a series of jacks, to be described, said jacks being retained in their grooves by means of cap plates $A^4$, secured to said cross bars support in turn a series of suitable posts, as $A^6$, herein represented as four in number, said posts being connected at their upper ends with the top plate $A^7$ of the machine.

The top plate, as herein represented, has erected upon it suitable uprights $A^8$, two or more, which uprights sustain at their upper ends a rigid cross bar $A^9$, having a suitable hole through which is extended a rod $A^{10}$, said rod being screw threaded at its upper end and having applied to it a nut $A^{12}$ by which to adjust the position of said rod vertically in said bar, said rod below said nut and between it and said bar $A^9$ being clamped by a clamping screw $A^{13}$ passed through the split hub of a lever $A^{14}$, slotted at one end, see Fig. 6, to receive a clamp screw $A^{15}$ by which to turn said rod more or less, as may be desired, and with it the dial needle bed $A^{16}$, connected to the lower end of said rod by a suitable bolt $A^{17}$, see Fig. 7, the adjustment of this rod being necessary in order to place the grooves in the dial plate into proper positions with relation to the grooves in the needle cylinder to be described, the vertical adjustment of the rod enabling the proper plane to be gained for the reciprocation of the dial needles with relation to the vertical movements of the cylinder needles.

The rod $A^{10}$ is surrounded by a sleeve B, the lower end of which is represented in Fig. 7 as extended to meet the flanged hub B′ of the dial cam plate $B^2$, said dial cam plate having a suitable groove $b$, the shape of which is best represented in Fig. 9 by dotted lines and in Fig. $8^5$. This groove differs from usual grooves in usual dial cams for the reason that the groove is made to reciprocate the needles not only when the dial cam revolves, but also when it reciprocates, at which time, however, the position of the cams with respect to the thread guides has been so changed, as will hereinafter appear, that the dial needles do not receive yarn or thread.

The sleeve B at its lower end just above the dial cam plate has clamped upon it by a clamp screw $B^3$ a split hub $B^4$, said hub having at its lower end a suitable ear $B^5$ in which is placed a locking device $B^6$, herein represented as a rod guided at its upper end in a plate $B^7$, interposed between the upper end of the split hub and a suitable shoulder $B^8$ of the sleeve, see Fig. 7, said locking device being surrounded by a spring $B^9$ which normally acts to depress the rod that it may engage a suitable hole or notch $b^{12}$ in the upper side of the dial cam plate. This locking device has two like shoulders $b'$, between which there is a space in which is entered one end of a dial locking device, said device being represented as a lever $b^2$, best shown in Fig. 2, pivoted at $b^3$ and having its longer outer end bent laterally and provided with a laterally extended toe, best shown in Fig. 5, said toe being acted upon at the proper time by a cam part $b^5$, said cam being formed on the hub of a toothed wheel $b^6$, having, see Figs. 2, 3 and 5, a series of legs 2 and 3, the legs 3 being longer than the legs 2; the said wheel having, as herein represented, four short legs and two long ones.

The toothed wheel is moved to turn about a stud $b^9$, the rotation of which, except when moved positively is restrained by means of a suitable friction device or spring, as $b^{10}$, Figs. 2 and 5. This toothed wheel and its cam hub is rotated intermittingly whenever it is desired to change from rib to reciprocating or plain circular knitting to rock lever $b^2$, said lever in its movements lifting the locking device from the hole $b^{12}$, thus permitting the dial cam plate to remain at rest while the sleeve carrying the dial locking device continues its movement, said locking device in the same rotation of the sleeve entering the hole $b^{13}$, thereby again locking and carrying with it the dial cam plate, said plate at such time occupying its inoperative position, or a position wherein the cam groove throws out the needles at a point opposite that where the cylinder needles are being fed with thread, so that locked in its inoperative position said dial cam plate, although reciprocating the dial needles, does not cause them to take thread, said needles being thereby held practically in their inoperative position while toe and heel knitting and plain circular knitting is being done.

When it is desired to resume rib knitting, that is, when the dial needles are to be reciprocated in such a position relative to the thread guides that they shall receive thread, the dial locking device is again operated by its cam $b^5$ to disconnect the pin $B^6$ from the hole $b^{13}$, whereupon the dial cam plate remains stationary with the dial plate $A^{16}$ until the sleeve carrying the pin $B^6$ has moved to engage the [illegible] $B^6$ with the other hole $b^{12}$ in the dial cam plate, at which time the dial cam plate is again locked in position to cause the dial needles to take thread and knit, the requisite movement of the dial locking device being under control of a pattern mechanism as will hereinafter appear.

The sleeve B, referred to, has clamped upon it by a suitable clamp screw $B^{10}$, Fig. 3, the hub of a bobbin carrier $B^{12}$, said carrier being herein represented as provided with three bobbins, $B^{13}$, $B^{14}$ and $B^{15}$, the bobbin $B^{13}$ being supposed to contain thread for the heel to be used in the production of the heel and toe, the bobbin $B^{14}$ containing thread for the production of the foot and ankle provided it is desired to make the ankle of the stocking of a thread like that used in the foot, while the bobbin $B^{15}$ is supposed to have a finer thread which is used alone in the production of the ribbed leg.

Below the hub of the bobbin carrier $B^{12}$ the said sleeve has clamped upon it by a suitable clamp screw $B^{16}$, the split hub of an arm $B^{17}$ which is connected by suitable set screws, as $b^{15}$, Fig. 3, to the cam cylinder to thereby afford proper steadying support for the said sleeve and the parts connected with it.

The cam cylinder $B^{18}$ is capable of being both reciprocated and rotated, as will be described, and taking with it the bobbin carrying ring and the dial needle cam plate except at certain intervals when the dial cam plate is unlocked temporarily, as already indicated, in order that its position may be changed with relation to the needle actuating cam of the cam cylinder, and thread guides.

The cam cylinder $B^{18}$ is provided with teeth, as represented in Fig. 5, which are engaged by the teeth of a toothed wheel $B^{19}$ flush with the upper surface of the plate $A^7$ and mounted on a shaft $B^{20}$, shown in Fig. 2, extended through a sleeve-like bearing $B^{21}$ connected with a part of the framework of the machine, said shaft having at its lower end a bevel gear $B^{22}$ which is engaged by a bevel gear $B^{23}$ fast on the cam cylinder moving shaft $B^{24}$, provided, see Fig. 2, with two loose gears $B^{25}$ and $B^{26}$, said gears having at their inner sides suitable openings or holes to receive suitable pins $B^{27}$, extended from a collar plate $B^{28}$ constituting a clutch, said plate being splined on said shaft and movable longitudinally thereon between said loose gears, whereby the said gears $B^{25}$ or $B^{26}$ will be locked to and will impart their motion to the shaft $B^{24}$.

Mounted in suitable bearings in the machine frame is the power shaft $B^{30}$ carrying at its outer end the two loose pulleys $B^{31}$ and $B^{32}$ each driven by separate belt or other driving connections at different speeds. Between said pulleys $B^{31}$ and $B^{32}$ is mounted any suitable form of clutch, as $B^{24x}$ splined to said shaft $B^{30}$, whereby either of said pulleys $B^{31}$ or $B^{32}$ may be connected to and constitute the driver of the shaft $B^{30}$ to thereby vary the speed. Fixed to rotate with the shaft $B^{30}$ is the gear $B^{29}$, Fig. 3, in constant engagement with the gear $B^{25}$ loose on the shaft $B^{24}$, and mounted subjacent the gear $B^{25}$ and intermeshing therewith is the intermediate gear $B^{33}$ which in turn is in engagement with the gear $B^{35}$. Thus it will be seen that the gear $B^{35}$ is given continuous motion from the power shaft through the gears $B^{29}$, $B^{25}$ and $B^{33}$.

Suitably guided in bearings or guides $B^{41}$ in the machine frame is the rack $B^{40}$, connected at its lower end by the link $B^{38}$ to the gear $B^{35}$, whereby the rack is given a constant reciprocating motion, and said rack is in mesh with the gear $B^{26}$ loose on the shaft $B^{24}$, thus the two gears $B^{25}$ and $B^{26}$, loose on the shaft $B^{24}$, are given motion, the former a constantly rotating, and the latter a constantly oscillating motion, and the movement of the one or the other of said gears is imparted to shaft $B^{24}$ according to which of them is connected to the clutch $B^{28}$, from which it will be evident that the cam cylinder may be given a rotary or reciprocating movement as desired, and by means of the different speeds given to the pulleys $B^{31}$ and $B^{32}$ such movements of the cam cylinder may be made fast or slow as conditions require, through the clutch $B^{24x}$. This invention is not limited, however, to any particular construction of the clutches for connecting the pulleys $B^{31}$ and $B^{32}$ to the power shaft or the gears $B^{25}$ and $B^{26}$ to the shaft $B^{24}$, as we may employ instead any usual speed changing gearing capable of operating the shaft at two different speeds, the essence of this feature being that the change of speed is under the control of the pattern mechanism and is therefore automatically effected at predetermined times.

A single cam for reciprocating the cylinder needles is preferably employed in the cam cylinder, one side of said cam being operative for circular work, and both sides of said cam being operative one after the other alternately during reciprocating work. Devices coöperating with said cam for automatically controlling the length of stitch are also provided, and these devices are under the control of the pattern mechanism, so that the length of the stitch may be automatically varied at predetermined times. This is greatly of advantage in the formation of the ribbed leg, because the stitch may by this means be proportioned with respect to the plain portion of the foot to provide a proper fitting ribbed leg. This cam cylinder $B^{18}$ surrounds a needle cylinder C which is grooved to receive the latch needles *c*, said cam cylinder having attached to its inner side by suitable screws, as C′, a steel ring $C^2$, the upper side of which constitutes for most of its length a rest upon which the butts of the needles after having been reciprocated to knit stand in their normal position. This ring is cut out at one part, as represented by dotted lines in Fig. 10, to constitute a space into which the butts of the needles may be depressed when they take thread to knit, said depression having coöperating with it a suitable knitting cam, as $C^3$, shown by dotted lines in Fig. 10 and in section in Fig. 11, said cam being suitably attached, as by a screw to a slide $C^4$ fitted into a suitable groove in the inner wall of the cam cylinder. This slide receives in it a stud screw $C^5$ which is embraced back of its head by the slotted end of a suitable lever or device $C^6$, shown in elevation in Fig. 10 and in section in Fig. 11, and pivoted upon a stud screw $C^7$, the outer end of the lever being acted upon by a suitable cam $C^9$, Figs. 7 and 10, formed on the tubular end of a cam sleeve $C^{10}$ mounted upon a stud screw $C^{11}$, the outer end of the sleeve having a series of teeth, as $C^{12}$, said teeth in the rotation of the cam cylinder striking at times one after another a stitch length regulator, see Fig. 7, represented as a pin 4 provided at its inner side with a projection $4^x$, see dotted lines Fig. 7, said pin being lifted by or through a suitable slide bar 5 connected to the pin 4 and located in one of the grooves of the cross bar $A^3$ hereinbefore described, said bar occupying a position between the needle jacks to be described, the lower end of said bar being acted upon by a pin or projection of a pattern surface at suitable times when the length of stitch is to be changed.

The mechanism for securing the automatic control of the length of the stitch herein described is the preferred form, but this feature of the invention is not to be limited to the particular mechanism nor otherwise than called for by the claims. The length of the stitch is determined by the amount of thread drawn off by the needle in making the stitch. In ribbed work the cylinder needles draw the thread over the dial needles, and in plain work the thread is drawn over the edge of the cylinder or over web holders or sinkers, such as herein provided. Hence the length of the stitch, according to the circumstances, can be changed in various ways, among which is the method herein described of lengthening the downward movement of the cylinder needles.

While the change in the length of the stitch is particularly described herein as being effected upon the change from one kind of knitting to another, such as from plain to ribbed, and also during the progress of one kind of knitting, such as in the ribbed leg, yet it is obvious that since this mechanism is under the control of the pattern mechanism that the change may be made automatically at such times as may be desired.

Viewing Fig. 10, it will be seen that the cam $C^9$ referred to is irregular in shape. It will be understood herein that the stocking proper is commenced at the toe pouch, and when the stocking is so commenced the toe of the lever $C^6$ stands on the high part 7 of the cam $C^9$, and at that time the stitch is the longest made, the thread used being usually the coarsest or heaviest thread used in the formation of the stocking. The cam $C^9$ stands in this position with its part 7 operative on the lever $C^6$ while the toe and the heel, and if desired the foot and the ankle, if an ankle is formed on a stocking, are being knit, only the cylinder needles at such time operating. When the ribbed leg is to be formed it must be started with a short stitch and the dial cam needles must be put into operative position between the change from plain stitch knitting to rib knitting, and preparatory to this change of knitting the cam $C^9$ is moved one step, letting the toe of the lever $C^6$ meet the flat portion of the cam between the point 7 and 8, and the dial needles having been put into operative position, the cam $C^9$ is moved again permitting the part 8 of the cam to act upon the toe of the lever and put the knitting cam in its highest position to make the shortest stitch, this shortest stitch being made as the first course of rib knitting is joined to a previous course of plain stitch knitting. During the formation of the leg the cam $C^9$ is moved, as herein represented, three times, each movement of the cam effecting a slight increase in the length of the stitch, the part 9 of the cam coming into operative position with the toe of the lever $C^6$ substantially as the leg is finished, such change of the lever gradually increasing the length of stitch in the leg to thereby give to the leg greater elasticity that it may fit the calf. The leg having been finished, we usually knit several courses of plain knitting preparatory to again commencing a toe, thus connecting the entire series of stockings in a web, and to commence this plain circular knitting following the completion of the top of the leg it is necessary to again throw the dial needles out of operative position, and during this time the part 10 of the cam $C^9$ comes under the toe of the lever $C^6$, and the change of needles having been effected the part 7 immediately comes into operative position again under the toe of the lever $C^6$, the position from which this description was started, and it stands there for a sufficient length of time to enable the toe, the foot, the heel, and as before stated, the plain knitting of the ankle, if used, to be carried on.

Viewing Fig. 10, it will be noticed that a single cam is used for operating the cylinder needles, said cam presenting two faces for the reason that at times the cam cylinder is employed to knit circular web, and at other times flat web, as when knitting toes and heels, so that both inclined faces of the cam are used to depress the needles. The ring $C^2$ presents at opposite sides of its depression in which the butts of the needles descend, suitable projections, as 12, see Fig. 10, which elevate the needles slightly above their normal position just before the needles are depressed to take yarn and form loops, such elevation putting the latches of the needles always high enough to pass through any loops that might be upon them, so that when a needle next descends its hook having taken a thread, said thread will be drawn through the loop then under the latch, for if the needle was not elevated sufficiently to lift its latch through the loop on its shank the needle would take two loops in its hook and a tuck stitch would be formed. The outer end of the lever $C^6$ is normally kept pressed against the cam referred to by a suitable spring 13, represented in Fig. 7.

The cylinder needles which it is not desired to use in the knitting of toes and heels, and consequently referred to as inactive needles, are all put automatically into their elevated or inactive position where they remain during movement of the machine for narrowing and widening. The endmost needles of the series used for heel and toe knitting are put out of operation, one or more as desired, at the end of each reciprocation, according to the abruptness of the narrowing desired, until the course in the toe and heel containing the fewest needles is reached, when the needles that have been put successively out of operation in narrowing are gradually brought back into operation to make the complemental half for the heel or toe, after which all the needles are automatically put into their active position and circular knitting is resumed.

The levers controlled by the pattern mechanism to put the inactive needles into their inoperative position are of peculiar and novel construction, said levers, as herein shown, being pivoted each upon a suitable wire bent in ring form, each lever having a shoulder which is engaged by a lip at the upper end of a slide-bar coupled at its lower end with a jack, the foot of which is suitably shaped to be acted upon, as herein shown, by a cam part of the pattern surface, said jacks being represented as located at each side of the needle cylinder in two rows, the jacks in each row standing in line one with the other, thereby to enable the bars of the pattern surface to be made straight and to be linked together in the form of a chain, all as will hereinafter more fully appear.

The needles $c$ are of the latched variety, and each needle is composed of a piece of wire suitably bent, as at $c'$, to form a nib, the wire being prolonged below said nib to form a tail $c^2$, said tail being bent to provide a notch $c^3$ which may be entered at the proper times by a suitable lever, as $c^4$, as when it is desired to put one of the needles used in narrowing and widening into its inoperative position, said lever remaining in engagement with the needle in its inoperative position until the needle is to be restored to its operative position. The tail of the needle for the greater part of its length is offset to contact with the inner side of the ring $C^2$ having the depression before described, other portions of the needle between said offset portion contacting with the bottom of the grooves in the needle cylinder.

The jacks $c^6$, Fig. 7, are alike at each side of the machine, so it will be unnecessary to refer specifically to but one set. These jacks are alike in two sets, one set at each side of the machine, see Fig. 9, and the jacks at each side stand substantially in the same line, the jacks fitting grooves in the cross-bar $A^3$, and being retained therein, as stated, by the plate $A^4$. The lower ends of these jacks are tapered, as at $c^7$, and said tapered lower ends are normally kept depressed toward the pattern surface, to be described, by means of suitable springs $c^8$, connected each at one end with a projection $c^9$ of the jack, and at its opposite end with a suitable pin $c^{10}$ of a plate $c^{12}$, suitably attached to the plate $A^4$. A third arm $c^{13}$ of each jack has a projection $c^{14}$ which enters a notch in the lower end of a slide $c^{15}$, fitted to be moved up and down in a suitable groove made in a circular flanged part $c^{16}$ of the plate $c^{17}$, fixed by suitable screws $c^{18}$ to a casting $c^{19}$, suitably bolted at $c^{20}$ to the cross-bar $c^{20a}$, the central part of said plate $c^{17}$ being hollow to permit the passage of the knitted stocking through it from the interior of the needle cylinder, said plate also supporting in fixed position by suitable screws $c^{21}$ the lower end of the needle cylinder.

A suitable ring $c^{22}$ is applied externally to the flange part $c^{16}$ of the plate $c^{17}$, said ring forming a cap or cover to retain the slides $c^{15}$ in the grooves of the flanged part $c^{16}$.

Herein we have represented a jack $c^6$ for each needle used in the machine, and each jack may actuate a suitable slide $c^{15}$. Each slide is notched near its upper end, see Fig. 7, to form a head $c^{24}$, preferably circular at its exterior, it entering a circular notch in a needle actuating lever $c^4$, we having represented herein a lever $c^4$ for each needle. These levers are each fulcrumed upon a ring $c^{25}$ suitably mounted in an annular groove in a flanged part $d$ at the upper end of the ring $c^{22}$, each of said levers $c^4$ being mounted in a radial groove in said flanged part, the outer end of each lever being at a point above said pivotal ring $c^{25}$ connected with a spring $d'$, in turn connected with a suitable pin $d^2$ fast in a plate $d^3$ suitably pinned at $d^4$ to a part of the ring $c^{22}$, said springs normally acting to keep the free ends of the levers $c^4$ down and out of engagement with the notches in the tails of the needles.

As hereinbefore stated, the machine herein being described is illustrated as provided with a lever $c^4$ for each needle, but in practice in this present machine where only circular work and reciprocating knitting is being done, said levers do not control all of the needles, as, for instance, there are twelve needles which occupy a central position with relation to the entire bank of needles used for narrowing and widening in reciprocating knitting which are not actuated by the levers.

When circular knitting is being done and it is desired to start reciprocating knitting for heel and toe work as herein represented, one half of the entire number of needles are at once elevated into their inoperative position by or through the levers $c^4$, all the jacks $c^6$ contained at one side of the machine being at such time acted upon and lifted simultaneously by a projection $d^5$, see Figs. 1 and 2, extending longitudinally of a cylinder $d^6$, having its shaft or journals sustained in the stands $A^2$, one end of the shaft carrying said cylinder being provided outside said stand with a ratchet toothed wheel $d^7$, which, when the needles not to be used in narrowing and widening are to be thrown out of operation, is engaged by a suitable pawl $d^8$, which brings the projection $d^5$ simultaneously under all the jacks at that side of the machine and lifts the levers $c^4$ so that they enter the notches of the tails of the needles, lifting all said needles and putting them into their inoperative position where they stand while reciprocating knitting is being done. The remaining portion of the needles are employed to narrow and widen respectively in the formation of the toe and heel pouches, and these needles must be, for narrowing, decreased in their number at each reciprocating stroke of the cam cylinder, so provision must be and has been herein made for lifting into their inoperative position one or more needles of the series of needles used for narrowing at the end of each reciprocating stroke of the cam cylinder. The purpose of putting these needles into their inoperative positions and again back into their operative positions is well understood, and we may put one or two needles, as desired, simultaneously into their inoperative or into their operative position in any manner now commonly practiced in knitting machines. To control these needles through their jacks and put them into their proper positions respectively for narrowing and widening, we have provided a pattern surface, herein represented as a chain D composed of twenty-six bars D′, each bar having suitable ears to receive screws, as $D^2$, to thereby join the plates together in an endless chain.

The chain may be composed of any desired number of bars, and it is hung on a suitable shaft $D^4$, carrying sprockets and having at one end an attached ratchet wheel $D^5$, which when reciprocating knitting is being done is engaged by a suitable pawl $D^6$ carried by a lever $D^7$ pivoted at $D^8$ on the fixed part of the framework, and having at its lower end a roller or other stud $D^9$ which is acted upon by a cam $D^{10}$ connected to or moving with the toothed wheel $B^{35}$.

The bars of the pattern surface which are used for putting into their inoperative position and restoring to their operative position the needles used in heel and toe knitting are provided each with acting faces or blocks, as $D'^{\times}$, suitably united to the opposite ends of the bars, each block presenting preferably a plurality of shoulders or inclines 14. The successive shoulders on the opposite blocks are staggered and are brought successively closer to the center of the length of the bars that said shoulders may act in succession at the ends of the series of needles being used in narrowing, to put the needles at the ends of the series of needles into their elevated or inoperative position at the end of each reciprocating stroke until all the needles, except as hereinbefore stated, twelve, have been lifted leaving said twelve needles to knit the narrowest course in the toe or heel, at which time the succeeding shoulders or inclines upon the bars then come into operation being separated one from the other, gradually return the needles thrown out of operation in narrowing into their operative position for widening. A pattern surface having graded steps for operating the needles one or more at a time, to put them into their inoperative and to again let them assume their operative position, is not new, so this part of this invention need not be herein further described.

During the narrowing and widening operations the pattern surface or chain D was moved step-by-step through the pawl $D^6$, actuated as already described from the cam $D^{10}$, but in the formation of circular work such continued movement becomes unnecessary, for which reason means have been provided to so control the action of the pawl, as to permit the pattern chain to remain at rest until such time as it may be needed to cause the actuation of some adjunct of the machine as will appear.

Pivotally connected to the rear end of the machine frame, at $g^3$, in position above the pattern chain D, is a lever $g^2$, having pivoted to its free end a pawl controller $D^{12}$ provided with an ear $g$ extended therefrom (Fig. 4) to normally engage beneath the pawl $D^6$ under the tension of spring $g^4$. Depending from the lever $g^2$ in position to engage a suitable pin or projection on the pattern chain D is an arm or finger $f^{26}$, which being lifted by the pin or projection on the pattern chain raises said lever $g^2$ and lifts the pawl $D^6$ out of actuating contact with the ratchet wheel $D^5$, and the pattern chain remains at rest. In order to again start the pattern chain, we provide a constantly moving controller chain $f^{29}$, Figs. 3, 4 and 14, comprising any usual form of pattern surface, preferably as an endless chain passing over the wheel $f^{29x}$ and having a ratchet wheel $f^{30x}$ which is engaged by a pawl $f^{31x}$ carried by a lever $f^{32x}$, pivoted at $f^{33x}$ and having its lower end in the path of a suitable projection or pin $e^{18}$ carried by the constantly rotating gear $B^{35}$ by which the chain is constantly moved under a controlling lever $f^{30}$ adapted to be raised at times by projections, as $f^{28}$, on the chain $f^{29}$.

The pawl controller $D^{12}$ below the ear $g$ has a depending trip arm $f^{31}$ in the form of an inclined end, Fig. 4, which when the pawl $D^6$ rests upon the ear $g$, is in the path of movement of the controlling lever $f^{30}$, the rise of which under the call of the pattern or chain $f^{29}$ moves the pawl controller on its pivot $g'$ and carries the ear $g$ from under the pawl $D^6$, allowing the latter to engage the ratchet wheel $D^5$ and again move the main pattern chain D. It will be seen from this construction that by proper disposition of risers on the controller chain $f^{29}$ and provision of pins or projections on the main pattern chain to act upon the finger $f^{26}$, that the said main chain can be made to move or dwell at pleasure, and advantage is taken of this fact to provide pattern pins or risers on the main chain to control the change of thread, to render active and inactive the dial needles, to change the length of stitch, to change the speed of the machine, and to change from rotary to reciprocating knitting and back again, as will be set forth hereinafter.

In order to change the operation of the machine from rotary to reciprocating automatically we provide the following mechanism: Assuming that the machine is operating to produce circular work, as the foot or leg portion, and it is desirable to change to reciprocating work for making the heel and toe pouches. The main pattern chain D is stationary, the pawl $D^6$ resting on the ear $g$, and the parts will so remain until a riser on the constantly moving controller chain $f^{29}$ comes under the controller lever $f^{30}$ whereupon, the pawl controller $D^{12}$ will be tripped to drop the pawl $D^6$ into engagement with the ratchet wheel $D^5$, thus starting the main pattern chain D. Mounted in an appropriate support on the main frame, as sleeve $e^2$, is a rock-shaft $e'$, carrying an arm $e$, which is in the path of movement of a suitable riser on the now moving main pattern chain. Secured to the opposite end of the rock-shaft $e'$ is the depending arm $e^3$, see Figs. 3 and 4, having joined to it a radius bar $e^4$, provided at or near its free end, at one side, see Fig. 5, with a cam projection $e^5$. The front end of said radius bar rests on a suitable fixed shoulder $e^6$, Fig. 3, in which is entered a stud screw $e^7$ upon which is mounted the hub of a shifting lever $e^8$, the hub of said lever being surrounded by a spring $e^9$, see Figs. 2 and 5, the outer end of which abuts against a suitable washer $e^{10}$ fast upon the outer end of the stud so that said lever may be moved laterally upon said stud, the said spring normally moving the lever in opposition to the cam $e^5$ on the radius bar $e^4$. The lever $e^8$ is slid to the right, viewing Fig. 5, by the cam projection $e^5$ of the bar $e^4$ when the rock-shaft $e'$ is moved by the pin or riser on the main pattern chain passing under the arm $e$ as will be obvious. Upon the lever $e^8$ is mounted a slotted switch $e^{12}$, Figs. $3^a$ and $3^b$, dagger pointed at each end, and occupying the position shown in Fig. 3 by dotted lines and pivoted on a stud $e^{12x}$ in said lever, the slot of the switch being entered by a stop pin $e^{15}$ which controls the extent of movement of the switch. The switch is held in either of its extreme positions by means of a locking device, herein represented as a pin $e^{16}$ surrounded by a spring, the acting end of the pin being shaped to enter either one of two depressions $e^{17}$, see Fig. $3^a$, made in the rear side of the switch. When the lever $e^8$ is moved bodily to the right on its stud $e^7$ with the switch in the position shown, see Fig. 3, a pin or projection $e^{18}$ extending inwardly from one edge of a block $e^{19}$ suitably secured to the toothed gear $B^{35}$, in the rotation of said wheel will meet the upper edge 50 of the switch at its right hand side, and acting on said switch turns said lever $e^8$ on its stud $e^7$, moving its upper end to the right in Fig. 3.

The upper end of the lever $e^8$ stands in a slot of the clutch controlling lever $e^{20}$ pivoted at $e^{21}$, Fig. 5, and moves said clutch controlling lever to the right in Fig. 3, thus shifting the clutch $B^{28}$ to the right to free it from engagement with the constantly rotating toothed wheel $B^{25}$ and engage said clutch with the constantly reciprocating toothed wheel $B^{26}$ preparatory to starting the cam cylinder in its reciprocating motions for narrowing.

The lever $e^8$ having operated the clutch and put it into engagement with the constantly reciprocating toothed wheel $B^{26}$, the radius bar $e^4$ is retracted by the riser passing from beneath the arm $e$ letting the spring $e^6$, surrounding the hub of said lever, restore it to its normal position, it standing there until the clutch is to be again changed to engage the constantly rotating toothed gear $B^{25}$ to effect the rotation of the cam cylinder for knitting circular work.

During the reciprocating knitting the main pattern chain continues to be moved step-by-step to effect the proper narrowing and widening of the fabric to form the heel or toe, and as the last bar of the widening portion of the pattern chain completes the heel or toe pouch all the needles are thrown into action by means to be described, and the motion of the cam cylinder is changed from reciprocating to circular in the following manner. In the movement of the pattern surface a pin in the bar $f^{11}$ meets the lever $e$, before described, and effects again through the radius bar $e^4$, and its connected parts, as described, the lateral movement of the lever $e^8$ to put its switch into position to be acted upon by the pin $e^{18}$ carried by the wheel $B^{35}$, as before, but at this time it will be understood that the switch having been shifted or moved by the pin $e^{18}$ occupies a position just opposite that represented in Fig. 3 by dotted lines, so that the pin $e^{18}$ in descending passes the upper inclined end $50^a$ of the dagger of the switch opposite the inclined part 50 and turns the shifting lever $e^8$ in a direction to move the clutch-controlling lever $e^{20}$ from its position with the clutch $B^{25}$ in engagement with the constantly reciprocating toothed wheel $B^{26}$ putting it into engagement with the constantly rotating toothed wheel $B^{25}$ to thus impart to the shaft $B^{24}$ a continuous motion of rotation for circular knitting.

Prior to the commencement of reciprocating knitting it is necessary to raise part of the needles to an inactive position, and as already indicated this is done by means of a pattern cylinder $d^6$ suitably journaled in the machine frame, and provided with a pattern or raising bar $d^5$ adapted on the rotation of the cylinder to engage the ends $e^7$ of the lifters or jacks $C^6$, the said cylinders being rotated by means of ratchet wheel $d^7$ engaged by pawl $d^6$ operated by the lever $d^9$ from the cam $d^{10}$ on the hub of the intermediate gear $B^{33}$. It is evident that the cylinder $d^6$ must be rotated only at intervals when for instance part of the needles are to be raised out of action by the bar $d^5$ on the commencement of reciprocating knitting and again when the needles are all to be made active on the commencement of rotary work. To thus regulate the actuation of the pattern cylinder $d^6$, we provide a pawl lifter $d^{11}$, pivoted at $d^{12}$, to the free end of a lever $d^{13}$, pivoted at $d^{14}$ to the machine frame, the said pawl lifter being provided at its lower end with a detent $d^{15}$, normally projected beneath the pawl $d^8$ by a spring $d^{16}$, and on the lever $d^{13}$ we provide a lifter $d^{18}$, the lower end of which, when a bar $d^5$ on the pattern cylinder $d^6$ is in position to pass on to its next movement beneath the needle jacks, is adapted to be engaged by a pin or lifter $d^{18a}$. Projecting from the side of the pawl lifter $d^{11}$ is an arm $d^{17}$, which engages the shifting lever $e^8$, and as such shifting lever is moved bodily to the right in Fig. 2 when changing from rotary to reciprocating movement, it is evident that the pawl lifter $d^{11}$ will be pulled from under the pawl $d^8$ and the latter will actuate the cylinder. It is necessary, when the cylinder $d^6$ has been turned sufficiently to place a bar $d^5$ beneath the needle jacks, that the said cylinder be held stationary during the entire formation of the heel or toe, or during narrowing and widening, and to effect this dwell of the cylinder we provied a second pawl lifter $m$ fast to a slide bar $m'$, adapted to move lengthwise on the clutch shifter $e^{20}$. It will be noticed that the second pawl lifter while adapted to slide on the clutch shifter, moves with said shifter as the latter swings on its pivot $e^{21}$, thus when the clutch is moved from the position shown by Fig. 2, where it is engaged with the constantly rotating gear $B^{25}$, to the position with the clutch in engagement with the reciprocating gear $B^{26}$ the second pawl lifter is moved beneath the pawl $d^8$, and the cylinder $d^6$ remains idle. The slide $m'$ is provided with one or more notches $m^2$ which, while reciprocating knitting is going on are engaged by the shifting lever $e^8$, so that on the first movement of the shifting lever $e^8$ bodily on its supporting stud $e^7$ the second pawl lifter is moved from under the pawl $d^8$ and the cylinder is then rotated to take the bar $d^5$ from beneath the needle jacks, thus throwing that half of the needles that remained idle during reciprocating knitting into action.

It is desirable during the formation of the heel and toe that the reciprocations of the cam cylinder shall be slow, as compared with the movement of said cylinder during circular work, and to automatically effect this change of speed as the change of movement in the cam cylinder is made, we provide on the rear part of the frame proper supports for a rock-shaft $i^6$, carrying an arm $i^7$ normally pressed toward the main pattern chain by a spring $i^{6x}$, and we provide on the main pattern chain a suitable pin or riser to turn the shaft $i^6$ as the said riser or pin passes beneath the arm $i^5$. On the end opposite the arm $i^5$ we provide an actuating arm $i^7$ which bears against an inclined projection $i^9$ on the hub of a speed lever $i^{10}$, normally pressed toward the actuating arm by a spring $i^{10x}$, Fig. 4. The lower end of said speed lever is normally out of the path of movement of the pin $e^{18}$ on the gear $B^{35}$, but when said lever is moved bodily sidewise against the tension of the spring $i^{10x}$ by the movement of the actuating arm $i^7$, the lower end of the speed lever is placed in the path of the said pin $e^{18}$. On the lower end of the speed lever is a wedge shaped shoe or switch $i^{15}$ pivoted at $i^{16}$ (Fig. 3), the swinging movement of the shoe or switch on said lever being limited by a pin $i^{17}$, in a slot in the upper portion of said switch or shoe.

When the speed lever is moved to place its lower end in the path of the pin $e^{18}$ on the gear $B^{35}$, the said speed lever will be moved to the left or to the right in Fig. 3, depending upon which side of the switch is engaged by the pin $e^{18}$. In the disposition of parts shown by Fig. 3 the switch $i^{15}$ will be engaged on its right hand side by the pin $e^{18}$, thereby moving the upper end of the speed lever to the right, and as the pin $e^{18}$ travels over the edge of the switch, it will turn the same to leave it in the position shown by dotted lines in Fig. 3, so that on the next engagement of the shoe or switch with the pin $e^{18}$, which is determined by the pattern on the main pattern chain, as already pointed out, the upper end of the speed lever will be moved to the left. The upper end of the lever $i^{10}$ engages the end of the bell crank lever $i^{14}$ pivoted at $i^{15x}$ and having a bifurcated arm $i^{xx}$ which engages the clutch $B^{24x}$. From this construction it will be seen that as the speed lever is moved the clutch $B^{24x}$ is put into engagement with one or the other of pulleys $B^{31}$ and $B^{32}$ to thereby change the speed and that such change of speed is directly under the control of the main pattern chain. While the change of speed is thus described as taking place upon the change from reciprocating to circular knitting, and vice versa, it is obvious that since the speed changing mechanism is controlled by the pattern surface, it may be changed at such other times as may be desired or found to be of advantage owing to the character of the work.

Mechanism for taking up the knitted web, comprising a main take-up with additional weights, and an auxiliary take-up or grab, all automatically controlled by means of the pattern cylinder, constitute one of the features of the machine.

The cam $D^{10}$, which as previously noted, is connected with and driven by the gear $B^{35}$, operates the lever $D^{14}$ which is pivoted on the frame of the machine at $D^{15}$. The lever $D^{14}$ carries at one end a roller stud $D^{13}$, riding on the said cam $D^{10}$, and at its opposite end the pawl $D^{16}$ which engages a ratchet wheel $D^{17}$ fast on a shaft $D^{18}$. A detent pawl $D^{161}$ prevents reverse rotation of the ratchet $D^{17}$. The shaft $D^{18}$ is mounted in the bearing blocks $D^{181}$, on the cross-bar $D^{182}$ of the main frame, and carries between the bearings a scored or fluted roll $D^{19}$, constituting the main or driving member of the take-up mechanism for the knitted web. The roll $D^{19}$ has coöperating with it a second fluted roll $D^{20}$, mounted in bearing blocks $D^{201}$, which are pressed forward by springs $D^{20x}$, so that the two fluted rolls are normally pressed together. Set screws $D^{202}$ are provided for adjusting or controlling the pressure of the rolls against each other.

A yoke $D^{21}$ is mounted on the shaft $D^{18}$ and carries at its forward or inner end a guiding roll $D^{22}$, located directly beneath the needle cylinder. The knitted fabric passes downward around under the roll $D^{22}$, and then upward and enters the bight of the fluted rolls $D^{19}$ and $D^{20}$. It will thus be seen that as the machine is operated the fluted rolls will be rotated step by step to take up and control the knitted fabric.

The take-up yoke $D^{21}$ has extending from one side thereof a cross-bar $w^2$. Weights $w$ are connected to the yoke $D^{21}$ by means of the suspending rod $w'$ which embraces between its limbs the cross bar $w^2$, Fig. 2 of the yoke. It is desirable at times to relieve the fabric of the strain due to the weights $w$, as in narrowing and widening, and said weights are therefore connected by rods $w^5$, to a lift lever $w^3$, pivoted at $w^4$, and having its upper end $w^6$ in the path of a suitable riser or projection $w^7$ on the pattern cylinder $d^6$, which is moved in relation to the main pattern chain D and positioned with relation to the bars $d^5$ for lifting the needles that as the latter act to render half the needles inoperative during heel and toe work, the riser or projection lifts the weight from the yoke. It is likewise desirable at times to entirely lift all weight from the fabric, for which reason we provide a second lift lever $w^8$, Fig. 2, connected to the yoke frame $D^{21}$ by a connection $w^9$, a suitable riser or pin is provided on the pattern cylinder $b^6$, in line with the lift lever $w^8$, and when this riser passes beneath the lever the entire yoke $B^{21}$ with its suspended weights will be raised, relieving the fabric of all strain. The riser or projection is preferably arranged to secure this result during the knitting of the toe and heel portion.

The yoke frame $D^{21}$ is also provided with an arm $D^{211}$, extending laterally therefrom and herein shown as an extension of the arm $w^2$ to the outside of the machine frame, a hole $D^{212}$ being formed in the frame for that purpose. This arm raises the lever $D^{14}$ sufficiently to prevent the cam $D^{18}$ from striking the roller $D^{13}$. Thus the operation of the take-up rolls $D^{19}$, $D^{20}$ ceases upon raising the yoke frame sufficiently to remove all weight from the web, as for example when the dial needles have all cast off to stop rib knitting and every other loop is thus free. The arm $D^{214}$ also constitutes a handle whereby the take-up may be raised by hand when desired.

The auxiliary take-up mechanism constructed in the form of a grab, and also controlled from the pattern cylinder and hence capable of being thrown into operation at desired predetermined times, is for the purpose of controlling the taking up of the fabric when the production of pouches, such as formed at the heel and toe prevent a substantially uniform tension being placed by the main take-up upon the fabric on the needles in action. This may occur in the production of the reciprocating knitting itself, or after the pouch has been formed and is still above the point where the web is seized by the main take-up, so that an unequal tension is being placed upon the needles. In the latter case it would be difficult, if not impossible, for example, to begin the ribbed knitting, which requires considerable tension on the web, without knitting a sufficient amount of plain circular work to extend past the bight of the main take-up or to equalize the tension.

The auxiliary take-up mechanism is constructed as follows: A grab, preferably in the form of a stem or bar 214, carrying at its upper end the grab proper or claw 216, is mounted to be vertically movable in suitable guideways 214′, which are formed in a frame 250, secured to the tie-plate A′ of the machine frame. A bent lever 212′ is pivotally mounted on the frame 250, and has a pin-and-slot connection at its lower end with the grab stem 214, and at its other end is provided with a projecting stud 210 in line with the lugs 209 on the pattern cylinder $d^6$. The grab normally tends to move downwardly under the action of the weight 215 attached to its lower end. When the lugs 209 come into operative position against the stud 210 of the lever 212′, the grab stem is thereupon raised. At this time the position of the grab is such with respect to the needles that it will at the end of its upward movement and as it is about to descend engage the fabric just below the cylinder top and under the influence of the weight 215 will serve to take up uniformly the fabric notwithstanding the fullness of the pouch produced in the narrowing and widening operations. If it is desired the grab may be reciprocated several times by means of the lugs 209 in order to insure a proper engagement of the grab or claw with the fabric. The web is thus held in such a manner by the grab and by the main take-up that a substantially uniform tension is placed upon the needles that are in action, and thus the work is properly handled.

The operation of the take-up, it will be seen, is entirely within the control of the pattern cylinder, as to whether it shall be weighted, as to whether its weight alone shall or shall not rest upon the fabric, and as to whether its fluted rolls shall be driven to feed the fabric. The operation of the grab is likewise determined from the pattern surface. It will be seen, therefore, that the timing and operation of these instrumentalities may be determined according to the character of the work to be performed, and the various conditions which may exist in the handling of the knitted web, and that it may be arranged according to the desire of the operator of the machine to secure the best results.

It will frequently be found that the sinkers and the take-up, or the sinkers alone, will take care of the web during reciprocating knitting to form the heel and toe pouches, and hence the grab or auxiliary take-up need not be thrown into operation at the times described. It is very important, however, that when rib knitting is begun and while it is carried on that there should be a substantially uniform tension on the fabric throughout. The take-up when thrown into action would act unevenly upon the web until after the last pouch had passed through it, owing to the slack in the web where the pouch occurred. Hence the grab or auxiliary take-up has an important function in producing the substantially uniform tension on the web preparatory to, or during a part of, the rib knitting by being thrown into action by the cam cylinder to take up any such slack portion of the knitted web.

The operation of the take-up it will be seen is entirely within the control of the pattern cylinder as to whether it shall be weighted, as to whether its weight alone shall or shall not rest upon the fabric, and as to whether its fluted rolls shall be driven to feed the fabric. The operation of the grab is likewise determined from the pattern cylinder. It will be seen, therefore, that the timing and operation of these instrumentalities may be determined according to the character of the work to be performed, and the various conditions which may exist in the handling of the knitted web, and that it may be arranged according to the desire of the operator of the machine to secure the best results.

An important feature of the invention specifically embodied in the mechanisms already described is the automatic securing of the requisite tension on the fabric for casting off the stitches from the needles in action at all times, whatever may be the character of work being performed upon the machine or whatever change may be made from one to another kind of work. It will be recognized that the conditions existing during plain circular, reciprocating or rib knitting are different in each case and that the tension on the knitted web must be controlled in order to secure the proper casting off of the stitches at all times. In the machine herein illustrated the throw of the sinkers is the same at all times, and the action of the sinkers, either alone or aided by the action of the take-up is sufficient during plain circular or reciprocating work to cast off the stitches. Upon the change to rib knitting, when the dial needles come into action, the tension on the web requisite to secure the casting off of the stitches under the new condition is obtained by automatically throwing into action the take-up, the weights on the take-up, and the grab or auxiliary take-up as the particular conditions may require, but it is obvious that other means may be employed than those specifically described for securing this feature of the invention, viz., means automatically controlled according to the character of the work, as upon the change from plain to rib knitting and vice versa, for securing the requisite tension on the fabric for casting off the stitches from the needles in action.

The action of the sinkers with their fixed throw or range of movement and positive action, and the take-up, weights, and grab or auxiliary take-up, all automatically controlled, is to produce at all times during the various knitting operations the requisite tension on the fabric for casting off the stitches from the needles in action, that is, whether the machine be knitting either ribbed, plain circular, or reciprocating work, so there is in fact in the specific embodiment of the invention thus illustrated an automatic means for securing the requisite tension on the fabric for casting off the stitches from the needles in action during the various knitting operations, and any such means is within the broad scope of this feature of the invention.

In the stocking which this machine was primarily designed to knit, the knitting is done as follows: A plain circular web is first knitted, and this is done with the take-up raised so that there is no weight whatever upon the knitted fabric; the machine then changes to reciprocating knitting to knit the toe pouch, and this is likewise knitted with the take-up raised and with no weight upon the fabric; the machine then changes to plain circular knitting and knits the body portion of the foot, during this procedure the take-up rests upon the web with just enough weight to keep the web straight; the machine then changes to reciprocating knitting to knit the heel pouch, and during this time the take-up is lifted and there is no weight whatever upon the knitted fabric; the machine then changes to plain circular knitting to make the ankle portion, and during this time the take-up is in the same condition as in knitting the previous plain circular web, that is, with just sufficient weight to keep the fabric straight; the machine then changes at the desired point to circular ribbed knitting, and when this change takes place, or just before, the grab is thrown into operation, being reciprocated if necessary to insure proper engagement with the web so that as the ribbed knitting is started the tension on the depending web will be as nearly as possible the same all around, for if it were not for the grab the pouch formed by the heel would cause one side of the stocking to stretch more than the other, and tucked or imperfect work might result at the beginning of the ribbed portion, at the same time the entire weight of the take-up and enough additional weight is thrown upon the depending web to take up the knitted fabric as the ribbed work is being knitted; at the end of the knitting of the ribbed work the weight is again removed and the take-up lifted and there is no weight upon the fabric as the plain circular web begins.

This invention is not limited to the particular means shown for entirely removing the operating weights from the take-up, and also for entirely removing both the weights and the weight of the take-up from the web.

The grab is actuated mechanically, that it may automatically engage and hold a heel or toe pouch as described; and any means for effecting the movements and operations just stated are considered as within the scope of this invention.

In order to place proper tension upon the threads at all times, any suitable form of tension and take-up may be employed, and for this purpose, we lead the threads through eyes $o$ over suitable tension wheels $o'$, and through the eye at the end of spring-controlled take-up arms, as $o^2$, to the thread-guides. The form of such take-up arms used for the circular knitting thread is and may be as usual, but in the case of the thread used for reciprocating knitting we have devised the following.

The bobbin stand $B^{12}$ has depending from it a suitable rod $o^3$ having at its lower end a suitable stud $o^4$, loosely surrounded by an arm $o^5$, see Figs. 1 and 4, a spring $o^6$ normally tending to lift said arm $o^5$ as will be obvious. On the other end of the stud $o^4$ is a guide $o^7$ free to turn thereon. Adjacent the rod $o^3$ is a rod $o^9$ connected to the bobbin stand and provided with a stud which receives a drop arm $o^{10}$, suitable counterweights, as at $o^{11}$, to normally depress the trip tail $o^{12}$ projecting in an opposite direction from the drop arm $o^{10}$. The thread used for reciprocating knitting is led from a bobbin on the bobbin supporting plate, through the eye $o$, guide $o'$, and around the guide $o^7$, thence through the eye at the end of the drop arm $o^{10}$ and through a like eye in the end of the take-up arm $o^5$. It will be evident, of course, that should the thread referred to break or become excessively slack the drop arm $o^{10}$ will be permitted to rise under the action of its counterweight, causing the trip tail $o^{12}$ to fall into the path of a stop trip now to be described.

Pivotally connected to the machine frame at $j^2$ is a stop lever $j^{10}$, Fig. 3, normally under the action of a spring $j^{14}$ tending to depress the rear end of said lever, being the right hand end viewing Fig. 3. On the rear end of the stop lever are two inclined fingers $j^{13}$, $j^{13}$, so positioned with respect to the adjacent arm of the bell crank lever $j^{14}$, which is connected to the clutch $B^{24x}$ between the speed pulleys $B^{31}$ and $B^{32}$, that on descent of the rear end of the stop lever $j^{10}$ one or the other of said inclined fingers will contact with the lever $j^{14}$, according to whether said lever is at the time holding the clutch in engagement with the fast or slow pulley, and thereby move the said bell-crank lever $j^{14}$ to carry the clutch into an intermediate position between the pulleys $B^{31}$ and $B^{32}$ and out of engagement with both, to thereby stop the machine, as will be understood. The stop lever $j^{10}$ in the normal operation of the machine is held in position indicated in Fig. 3, with its rear end raised, said position being maintained against the tension of spring $j^{14}$ by means of a trip catch $p$, pivoted at $p'$, and having a shoulder $p^2$, Fig. 2, to engage above the end of lever $j^{10}$. A light spring $p^4$ may be employed to keep the hand grip $p^3$ from falling out of convenient reach when the trip catch is free. It will be evident that by a downward impulse on the grip $p^3$, the shoulder of the trip catch will be released from the stop lever $j^{10}$, and the latter will move under the action of spring $j^{14}$ to stop the machine in the manner described.

Pivoted on the trip catch $p$, at $p^5$, is a trip lever $p^6$ in the form of a bell crank, the lower arm of which rests against the stop lever $j^{10}$, Fig. 2, the spring $p^7$ tending simply to relieve the pressure on the stop lever due to the long arm of the trip lever $p^6$, the said long arm being provided with a number of holes into one of which is engaged the upper end of a rod or connection $p^8$, attached at its lower end to the projecting arm $o^{2x}$ of the take-up yoke $D^{2x}$, Figs. 1 and 2. From this construction it will be evident that if the thread used for circular work breaks, the needles will no longer be supplied, and will shed their loops permitting the fabric to become disengaged from the needles and fall. This release of the fabric permits the entire weight of the take-up yoke to act on the rod or connection $p^8$, thus pulling down the long arm of the trip lever $p^6$, and by its short arm resting against the stop lever, free the trip catch from said stop lever and effect a stopping of the machine as described.

In case the thread used for reciprocating work breaks, however, the fabric is not entirely released from the support of the needles, but will be sustained by the inactive set, therefore the take-up can not be relied upon to stop the machine on the breaking of the thread used for reciprocating work. To secure this result, however, we pivotally mount on a bracket $p^9$, Fig. 2, at $p^{11}$, a lever $p^{10}$, the lower end of which stands across the long arm of trip lever $p^6$, and is acted on by a spring $p^{12}$. The upper end of this lever is notched at $p^{13}$ to receive the end of a trigger $p^{14}$, pivoted to the frame at $p^{15}$, and engaging by its opposite extremity the bifurcated end of a stop arm or actuator $p^{16}$, pivoted to the frame top at $p^{17}$ and provided with projections $p^{18}$, adapted to be engaged by the trip tail $o^{12}$, when it is permitted, by the breaking of the thread used in reciprocating work, to fall. It will be evident that the trip tail $o^{12}$ will turn the lever $p^{16}$ and release the lever $p^{10}$ to effect the stopping of the machine through the instrumentalities hereinbefore set forth. A mechanism for changing the thread as desired is also provided, and this mechanism is under the control of the pattern mechanism so that its operation is determined entirely automatically. It is desirable to change the thread at times to proportion the size thereof in different portions of the stocking, and it is also desirable to introduce reinforcing threads, as at the heel and toe, and the present invention comprises mechanism for securing either the change, addition or omission of a thread at such periods as may be predetermined and in the claims the term "change" when used alone in this connection is to be regarded as applying to either all or any change, substitution, addition or omission of one or more threads. The following mechanism is provided as embodying this feature of the invention, but the invention is not confined to any specific mechanism. This mechanism will only be described in a general way because it is illustrated and described in detail in Patent No. 879,821, granted February 18, 1908, upon an application divided out from application Serial No. 46,004, filed February 4, 1901. A thread-guide stand E is secured to the top of the cam cylinder and supports the thread-changing mechanism. This stand carries a suitable frame $T^3$ in which are movably mounted the thread-guides through the end of which the thread passes to the needles and the slide arms for operating the thread catchers which catch the thread as it is withdrawn from the needles to hold the end of the thread as the thread-guide is moved to feed the thread to the needles. As set forth in said patent any number of thread guides and catchers may be used, and in the present embodiment of this invention we have shown three, one for the heel and toe thread, one for the thread used to form the plain circular web of the foot and ankle portion, and the third for the ribbed leg. The thread guides and catchers are operated in one direction by springs, and in the other direction from face cams carried by the toothed wheels $t^{13}$, turning on the studs $t^{12}$, mounted on the stand T. The relation of the cams is such in each case that the thread-guide first moves outwardly to carry the thread to the needle before the catcher is moved outwardly to free the end of the same thread, thereby insuring the engagement of the thread with the needles and the formation of several stitches prior to releasing the thread end. Upon rotation of the toothed wheels $t^{13}$, the thread guides will be actuated to supply thread to the needles, and thereafter the catcher coöperating with said guide will be operated to release the end of the thread. Upon further rotation the thread guides will be actuated to withdraw the thread from the needles, at which time it will be caught by the catcher, the end being retained beneath the catcher, the parts remaining in their supplying or non-supplying position until such time as the change is desired to be made.

In order to actuate the toothed wheels $t^{13}$ at the desired times to supply or withdraw the thread, we provide the main pattern chain D with a series of risers or projections, which act upon pins passing through holes in the top plate of the machine, to lift them so that they will project into the path of the teeth on said wheels and turn the same as they are carried around by the cam cylinder, as will hereinafter appear.

To effect the above results, we connect to the frame of the machine a number of levers $v$, $v'$, $v^2$, Fig. 4, pivoted respectively at $v^3$, $v^4$, $v^5$, and provided at their free ends with pins $v^6$, $v^7$, $v^8$, respectively, that pass through suitable holes in the bed plate and are adapted to be raised into the path of the teeth on the wheels $t^{13}$ by means of risers or projections, such for instance as $v^9$, $v^{10}$, $v^{11}$, on the main pattern chain D, acting on the ends of suitable fingers $v^{12}$ projecting from the levers $v$, $v'$, $v^2$. The arrangement and disposition of the risers on the pattern chains and the pins for engaging with the toothed wheels will depend, of course, upon the particular changes desired to be made in the thread during the knitting operation, but in the present instance we have so disposed the risers and pins that in knitting the toe one thread is employed, which when passing to circular work for the foot portion is removed from engagement with the needles and a lighter thread of medium weight is substituted. This thread is continued to be knit until the heel pouch is reached, at which time the pattern chain is moved to bring other risers into position to lift the pins into the path of movement of the toothed wheels to thereby again effect the change from said medium weight thread to the previous heavy thread used in the toe portion, and on completion of the heel pouch and just prior to the commencement of circular knitting for the ankle portion other risers are provided to again project the pins to cause rotation of the toothed wheels to effect a change of thread. Prior to commencement of the ribbed leg portion the lightest thread of the series is introduced, and for this purpose other risers are employed on the pattern chain to effect the operation of the thread guides and secure a change of thread. It is desirable in making this change of thread at the various stages specified to introduce the previously inactive thread prior to the withdrawal of the previously knitting thread, and to this end it is necessary so to operate the thread guides in their changing movement as to throw in the idle thread for several stitches prior to withdrawing the knitting thread, to do which it is necessary to provide each toothed wheel with a separate series of actuating pins.

By a proper arrangement of risers on the main pattern chain it will be evident that the actuating pins for the toothed wheels may be thrown into position, as desired, and inasmuch as the change of thread is to be effected after several stitches of the previously inactive thread have been made, it follows that a single set of pins, as $v^6$, $v^7$, $v^8$ for the toothed wheels will not be sufficient, and we have therefore disposed in the circular series of pins other pattern controlled pins, as $v^{16}$, $v^{17}$, $v^{18}$, so that the timing of the change of thread may be accurately controlled.

Each of the toothed wheels is provided with a number of teeth, two of which teeth at opposite sides are prolonged to engage, when in their lowest position, with suitable stationary pins, as 190, 191, 192, on the top plate of the machine, the shorter teeth being adapted to engage other pattern-controlled pins, as described. In order to further provide for turning the toothed wheel at desired times, we pivot upon the machine frame an additional lever $v^{182}$, similar to the levers $v$, $v'$, $v^2$, previously described, and having a depending finger $v^{19}$ adapted to engage with a suitable riser on the pattern chain, and projecting from the end of said lever $v^{182}$ we provide two pins $v^{20}$ and $v^{21}$.

The general disposition of the risers to effect the desired change in thread and the location and disposition of the pins to properly time the operation of the toothed wheels with respect to each other is a matter well understood and within the scope of the art, and need not be herein further described, it only being necessary that the main pattern chain be provided with the necessary risers to operate the toothed wheel at desired times, all as will be readily understood.

It will readily be seen that the position of the movable pins, which are controlled by the risers on the pattern surface, and the position of the stationary pins, depends upon the timing of the machine and upon the particular point at which the desired thread is to be introduced into the web, or taken out therefrom. The positioning and timing of these pins will, therefore, be largely at the option of the operator of the machine according to the particular kind of work which it is desired to perform thereon. In practice a number of holes may be made in the circular paths of the toothed wheels, and these pins may be changed and arranged as desired. While the pins 190, 191 and 192 have been termed the stationary pins they are stationary only in the sense that they are not vertically movable, as in the case of the pins operated by the risers. They may, however, be removed and replaced in any desired position to perform their desired functions. The set of pins $v^{16}$, $v^{17}$ and $v^{18}$ are chiefly necessary to secure the proper operation of the toothed wheels with respect to each other when it is desired, as usual, to insert the new thread before the old thread has ceased knitting. The three wheels are necessarily arranged one ahead of the other and a considerable distance apart, and by the use of these pins necessary relative operation of the wheels can more readily be secured.

The movable pins $v^{21}$ and $v^{20}$ are especially designed for use where a change of thread is made during reciprocating knitting, as at the toe or heel portion. They will be arranged to operate the particular wheels whose threads are desired to be changed, and if it were not for them the thread could not be changed during reciprocating knitting where the toothed wheels are not carried clear around over the various pins, but are obviously oscillated back and forth in their circular path.

In the machine as herein designed the pattern chain $I^1$ is moved once to every two revolutions of the cam cylinder $B^{18}$, which carries the toothed wheels, and therefore the toothed wheels will pass twice over the pins as they are positioned by the risers on the pattern surface for any given position. The arrangement of the long and short teeth on the toothed wheel is rendered necessary for this reason.

Fig. 17 the direction of rotation of the cam cylinder is indicated by the arrow thereon. The three toothed wheels are indicated in dotted lines, and marked $1t^{13}$, $2t^{13}$, $3t^{13}$. Assume as a simple condition that the knitting is being done by the thread controlled by the toothed wheel $3t^{13}$ and that it is desired to drop this thread out and substitute the thread controlled by the toothed wheel $1t^{13}$, but that this latter thread shall be inserted before the former is thrown out. The risers on the pattern chain would be arranged so as to elevate the pines $v^6$ and $v^8$, and the stationary pins 190 and 192 would be inserted in a suitable place, about as indicated in Fig. 17. As the cam cylinder $B^{18}$ carried the toothed wheels around they would be in position, with a short tooth projecting downwardly and the long tooth being in position to take the place of the short tooth when the short tooth was struck by the pin. The wheels on reaching the pins $v^8$ and $v^6$ would be given one-sixth of a turn, the wheel $1t^{13}$ being turned first because it is angularly so far ahead of the wheel $3t^{13}$. The pins $v^8$, $v^6$ would thus swing the long teeth into the lowermost position, and upon the continued rotation of the cam cylinder the pins 190 and 192 would strike against the long teeth and turn the wheels another sixth of a revolution, thus putting the threads controlled by the respective wheels either into or out of operation, according to which of the two long teeth were struck. In the case under consideration the thread controlled by the wheel $1t^{13}$ would be out of operation and would accordingly be put into operation by the pin 190, and the thread controlled by the wheel $3t^{13}$ being in operation would be put out of operation by the pin 192. Again, it will be noted of the wheel $1t^{13}$ being far in advance angularly of the wheel $3t^{13}$ would be put into operation some time before the dropping out of the thread controlled by the wheel $3t^{13}$. On the second rotation of the cam cylinder past the pins $v^8$, $v^6$, the short teeth succeeding the long teeth would be struck and the toothed wheels given another sixth revolution to place them in position for a repetition of the movements described, and then the pins $v^8$ and $v^6$ would be lowered by the turning of the pattern chain so as not to be struck by the toothed wheels upon subsequent revolutions of the cam cylinder until another change was desired.

In reciprocating knitting, the toothed wheels will obviously not pass twice in the same direction over the various pins, hence the additional set as $v^{20}$, $v^{21}$ is necessary to give the three movements to the wheels.

Figure 8C:
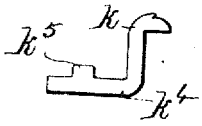

In Figs. 8 and 8c we have shown a form of web holder which we use in the present form of our invention, said web holder comprising an upright arm $k$, a shank $k^4$ having a nib $k^5$, the shank resting on a ring $k^6$, with the nib in engagement with the cam groove $k^x$ of the web holder $k^{xx}$, shown in Fig. 8[a], whereby the said web holder is operated as usual. In knitting rib work the thread is measured off by the cylinder needles drawing the same over the dial needles. In knitting plain work the sinkers $k$ serve first, as devices over which the thread is measured off by the cylinder needles, and, second, as web holders, the small barb on the upper surface holding the web down against the upward thrust of the needles. These web holders or sinkers are continuously in operation, and it is difficult to say to what extent they may perform their function of holding down the web during rib knitting, but in plain knitting this function is important and may be used to the exclusion of the other take-up mechanism at times.

In order to insure the proper opening of the latches of the cylinder needles we pivot, as shown in Fig. 5, a latch opener $q$ on the thread guide stand at $q'$, having its end $q^2$ in proximity to the needles as they are passed during rotary work, and on the end of said latch opener we may provide bristles to insure the turning of the latches. In the opposite end of the latch opener we provide a slot $q^3$ entered by a pin $q^4$ on the top of the cam cylinder.

As is usual in this class of machines the thread guide stand during reciprocating work must be given a certain amount of lost motion so as to lag behind the cam cylinder in its reciprocation to thereby properly position the thread guides with respect to the cylinder needles that the guides will supply thread in each throw of the reciprocating movement, and while we have shown the devices such as the spring arms $q^5$, notches $q^6$ in the flange of the thread guide stand, and the pattern controlled pin $q^7$, it is not deemed necessary to further describe this construction, as it forms no part of this present invention.

Referring now to the latch opener it will be evident that as the cam cylinder is reciprocated, and owing to the lost motion referred to, the eccentric formation of the slot $q^3$ in the long arm of the latch opener engaging the pin $q^4$ on the moving cam cylinder will cause the latch opener to present its latch opening end close to the needles when moving in one direction and to withdraw it when moving in the opposite direction. Thus during the reciprocating movement the latch opener is moved to and from the needles, to cause the latches to open when the cam cylinder is moving in one direction and to free said latches and not interfere with the needles and yarn when it is moving in the opposite direction, as will be understood.

When the change is to be made from plain to rib knitting, or vice versa, it is necessary that the dial cam plate be unlocked from its connection with the hub B, as hereinbefore described, such movement of the locking device being effected by a toothed wheel mounted on the stud $b^6$. In order to turn said toothed wheel at the desired times to secure the change in character of knitting described, we provide the main pattern chain with a suitable riser, as will be well understood, to act upon the toe of a lifter $r$, carrying a pin $r'$, Fig. 1, projecting through the bed plate of the machine, and adapted to be lifted into the path of the teeth 2 on the toothed wheel $b^6$, the said wheel being provided with longer teeth 3, one of which on a partial rotation of said wheel by the pin, as described, is placed in the lowered position, shown in Fig. 3, to engage a fixed pin, as for instance $r^2$, on the top plate of the machine upon further movement of the cam cylinder, and on a subsequent rotation of the cam cylinder, one of the short teeth 2 is engaged by the lifter pin $r'$, Fig. 1, to complete the semi-rotation of the toothed wheel. The particular disposition of pins and risers for rotating the toothed wheel are not essential, it only being necessary that the pattern chain effect the rotation of said wheel at the desired period in the knitting operation to cause the cam $b^5$ to manipulate the arm $b^2$ to disengage or unlock the dial-cam plate from the hub, to thereby so dispose the dial needles with respect to the thread guides that at the time rib knitting is desired the dial needles will take thread and knit, and when plain knitting is to be done the dial needles will not take thread, and consequently will not knit.

While we have thus described in detail the specific features of structure that appear in the present embodiment of our invention, it is to be understood that such specific structure is not essential, as the same may be varied within the wide limits without departing from the spirit of this invention.

The operation of the machine to produce a stocking, as contemplated in our patent hereinbefore referred to, is as follows: Assuming the machine to have just completed a stocking by knitting the ribbed leg and several plain circular courses dividing the leg of one stocking from the toe of the next succeeding stocking, the main pattern chain is rendered active through the constantly moving controller chain, and through it the radius bar is actuated to move the shifting bar $c^8$ into the path of its operating means to effect the change from circular to reciprocating knitting. Such movement of the shifting lever $c^8$ by the radius bar simultaneously withdraws the pawl lifter $d^{11}$ from under the pawl $d^8$, thereby causing the pattern cylinder $d^6$ to be operated to bring a bar $d^5$ beneath the jacks, the needles of which are to remain idle during reciprocating work, and immediately thereafter, the movement of the clutch shifter $e^{20}$ to engage the clutch with the reciprocating gear $B^{26}$, places the arm $m$ beneath the pawl $d^8$ to cause a dwell of the cylinder $d^6$ during reciprocating work. The thread guides are operated to effect a change of thread, the length of stitch may be changed, if desired, and the speed of the cam cylinder reduced for reciprocating, the dial cam plate having been also disengaged from its locking means by the riser on the pattern chain to cause said dial cam plate to change its position with respect to the dial needle plate and cam cylinder, so that the dial needles although continued to be reciprocated, no longer take thread. The main pattern chain continues to move by virtue of its pawl and ratchet during narrowing and widening, the lags on said chain successively operating on the needle jacks of the set of needles used in forming the heel and toe pouches, to successively retire one or more needles from the end of the series of needles, and to then in like manner successively return them to active position. As the toe pouch nears completion, the medium weight thread is introduced and subsequently the heavy thread used for the toe is withdrawn under direction of the main pattern chain, the radius bar being moved by the main pattern chain to move the shifting lever to change from reciprocating to rotary knitting. Such movement of the radius bar frees the pawl for operating the pattern cylinder $d^6$, which is then rotated a sufficient distance to free the needle jacks from control of the bar $d^5$ and to free the take-up and weight to be sustained by the fabric, the grab being operated on movement of the cylinder to engage the toe pouch to take up slack, after which the pawl lifter $d^{11}$ by a riser on the cylinder $d^6$ lifts the pawl from the ratchet $d^7$ and the cylinder remains at rest with all the needles in action. The speed of the cam cylinder is now increased by shifting the speed lever $e^{10}$ under the call of a riser on the moving main pattern chain and circular knitting is pursued with the medium weight thread and at an increased speed, the main pattern chain being now freed from the actuation of its pawl by the pawl controller $D^{12}$ under the call of a riser on the main pattern chain, the said chain remains at rest, and circular knitting is continued until the heel pouch is reached at which time the controller chain frees the pawl $D^6$ from the controller $D^{12}$ and the operation described for the toe is carried on to produce the heel pouch. If a plain ankle portion is to be knit, after the production of the heel pouch, plain knitting, with a change of thread, and change of speed is resumed as described for the foot between the toe and heel, after which rib knitting is commenced in circular course by a still further change of thread to that of fine gage, and a change of stitch, the high speed being continued throughout the leg, and the length of stitch being varied from the ankle upward to accord with the size and elasticity of the fabric necessary to fit the form. Just prior to commencing rib knitting the main pattern chain is moved to bring into position a riser to effect a change of thread to that of fine gage, to change the length of stitch, as has been described, and to unlock the dial cam plate so that it may assume position with respect to the dial plate and cam cylinder to cause the dial needles to take thread and co-act with the cylinder needles in the production of ribbed work, after which the main pattern chain remains at rest until called into action again by the continuously moving controller chain, as will be understood.

While the operation has thus been described it is obvious from the previous description of the features of the invention and the constructions in which they may be embodied, that these operations may be varied in many ways and to various extents. The invention is such, and the various mechanisms are so related to each other, that a wide variation in the operation of the machine and its parts and in the character of work produced thereon is within the scope of the invention.

This application is a continuation of application Serial No. 46,001, filed February 4, 1901.

Having described our invention, what we claim as new and desire to secure by Letters Patent, is:

1. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired.

2. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, and mechanism for automatically changing the threads during the knitting operation as desired.

3. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, means for automatically varying the speed of the knitting upon or preparatory to the change from one kind of knitting to another.

4. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, and mechanism for automatically changing the threads during the knitting operation as desired, means for automatically varying the speed of the machine at predetermined times as required by the character of the work.

5. In a circular knitting machine, two sets of needles and operating means therefor, pattern mechanism for controlling the operation of said needles to produce either ribbed, plain circular, or reciprocating work as desired, sinkers, and means for operating them to depress the web a take-up for the fabric being knit, means for automatically throwing into and out of operation the take-up as desired, pattern-controlled means for varying the amount of thread drawn off by the needles.

6. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, and mechanism for automatically changing the threads during the knitting operation as desired, pattern-controlled means for varying the amount of thread drawn off by the needles.

7. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, means for automatically varying the speed of the knitting upon or preparatory to the change from one kind of knitting to another, pattern-controlled means for varying the amount of thread drawn off by the needles.

8. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, and mechanism for automatically changing the threads during the knitting operation as desired, means for automatically varying the speed of the machine at predetermined times as required by the character of the work, pattern-controlled means for varying the amount of thread drawn off by the needles.

9. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform.

10. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, and mechanism for automatically changing the threads during the knitting operation as desired.

11. In a circular knitting machine, two sets of needles, and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, means for automatically varying the speed of the machine upon or preparatory to the change from one kind of knitting to another.

12. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, and mechanism for automatically changing the threads during the knitting operation as desired, means for automatically varying the speed of the machine at predetermined times as required by the character of the work.

13. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, pattern-controlled means for varying the amount of thread drawn off by the needles.

14. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, and mechanism for automatically changing the threads during the knitting operation as desired, pattern-controlled means for varying the amount of thread drawn off by the needles.

15. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, means for automatically varying the speed of the knitting upon or preparatory to the change from one kind of knitting to another, pattern-controlled means for varying the amount of thread drawn off by the needles.

16. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, means for automatically throwing into and out of operation the take-up as desired, an auxiliary take-up, means for automatically throwing said auxiliary take-up into engagement with the web, whereby the occurrence of slack in any part of the web is controlled to make the tension on the needles in action substantially uniform, and mechanism for automatically changing the threads during the knitting operation as desired, means for automatically varying the speed of the machine at predetermined times as required by the character of the work, pattern-controlled means for varying the amount of thread drawn off by the needles.

17. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, a weight connected with said take-up, means for automatically throwing into and out of operation either the take-up or the combined take-up and weight as desired.

18. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine upon or preparatory to the change from one kind of knitting to another.

19. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine at predetermined times as required by the character of work.

20. In a circular knitting machine, two sets of needles and operating means therefor, pattern mechanism for controlling the operation of said needles to produce either ribbed, plain circular, or reciprocating work as desired, sinkers, and means for operating them to depress the web, a take-up for the fabric being knit, a weight connected with said take-up, means for automatically throwing into and out of operation either the take-up or the combined take-up and weight as desired, pattern-controlled means for varying the amount of thread drawn off by the needles.

21. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine upon or preparatory to the change from one kind of knitting to another, pattern-controlled means for varying the amount of thread drawn off by the needles.

22. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine at predetermined times as required by the character of the work, pattern-controlled means for varying the amount of thread drawn off by the needles.

23. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine upon or preparatory to the change from one kind of knitting to another.

24. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, an auxiliary take-up, means for automatically throwing said auxiliary take-up into engagement with the web whereby the occurrence of slack in any part of the web is controlled to make the tension on the needles in action substantially uniform, mechanism for automatically changing, adding or omitting one or more threads during the knitting operation as desired, means for automatically varying the speed of the machine upon or preparatory to the change from one kind of knitting to another.

25. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine at predetermined times as required by the character of the work.

26. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, an auxiliary take-up, means for automatically throwing said auxiliary take-up into engagement with the web whereby the occurrence of slack in any part of the web is controlled to make the tension on the needles in action substantially uniform, mechanism for automatically changing, adding or omitting one or more threads during the knitting operation as desired, means for automatically varying the speed of the machine at predetermined times as required by the character of the work.

27. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine upon or preparatory to the change from one kind of knitting to another, pattern-controlled means for varying the amount of thread drawn off by the needles.

28. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, an auxiliary take-up, means for automatically throwing said auxiliary take-up into engagement with the web whereby the occurrence of slack in any part of the web being knit is controlled to make the tension on the needles in action substantially uniform, mechanism for automatically changing, adding or omitting one or more threads during the knitting operation as desired, means for automatically varying the speed of the machine upon or preparatory to the change from one kind of knitting to another, pattern-controlled means for varying the amount of thread drawn off by the needles.

29. In a circular knitting machine, two sets of needles and operating means therefor, pattern mechanism for controlling the operation of said needles to produce either ribbed, plain circular, or reciprocating work as desired, a take-up for the fabric being knit, means for automatically throwing into and out of operation the take-up as desired, mechanism for automatically changing, adding or omitting one or more threads during the knitting operation as desired, means for automatically varying the speed of the machine at predetermined times as required by the character of the work, pattern-controlled means for varying the amount of thread drawn off by the needles.

30. In a circular knitting machine, two sets of needles and operating means therefor, pattern mechanism for controlling the operation of said needles to produce either ribbed, plain circular, or reciprocating work, as desired, a take-up for the fabric being knit, means for automatically throwing into and out of operation the take-up as desired, an auxiliary take-up, means for automatically throwing said auxiliary take-up into engagement with the web whereby the occurrence of slack in any part of the web is controlled to make the tension on the needles in action substantially uniform, mechanism for automatically changing, adding or omitting one or more threads during the knitting operation as desired, means for automatically varying the speed of the machine at predetermined times as required by the character of the work, pattern-controlled means for varying the amount of thread drawn off by the needles.

31. In a circular knitting machine, two sets of needles and operating means therefor, pattern mechanism for controlling the operation of said needles to produce either ribbed, plain circular, or reciprocating work as desired, and means automatically varying in operation as required during the various knitting operations to secure the requisite tension on the fabric for casting off the stitches from the needles in action.

32. In a circular knitting machine, two sets of needles and operating means therefor, pattern mechanism for controlling the operation of said needles to produce either ribbed, plain circular, or reciprocating work as desired, means automatically controlled according to the character of the work for securing the requisite tension on the fabric for casting off the stitches from the needles in action.

33. In a circular knitting machine, two sets of needles and operating means therefor, pattern mechanism for controlling the operation of said needles to produce either ribbed, plain circular, or reciprocating work as desired, means automatically controlled upon the change from plain to rib knitting and vice versa for securing the requisite tension on the fabric for casting off the stitches from the needles in action.

34. In a circular knitting machine, two sets of needles and operating means therefor, pattern mechanism for controlling the operation of said needles to produce either ribbed, plain circular, or reciprocating work as desired, sinkers, and means for operating them to depress the web, additional means for producing tension on the fabric for casting off the stitches from the needles in action, automatically controlled to apply or vary said tension as required.

35. In a circular knitting machine, two sets of needles and operating means therefor, pattern mechanism for controlling the operation of said needles to produce either ribbed, plain circular, or reciprocating work as desired, means automatically controlled according to the character of the work for securing the requisite tension on the fabric for casting off the stitches from the needles in action, pattern-controlled means for varying the amount of thread drawn off by the needles.

36. In a circular knitting machine, two sets of needles and operating means therefor, pattern mechanism for controlling the operation of said needles to produce either ribbed, plain circular, or reciprocating work as desired, means automatically controlled upon the change from plain to rib knitting and vice versa for securing the requisite tension on the fabric for casting off the stitches from the needles in action, pattern-controlled means for varying the amount of thread drawn off by the needles.

37. In a circular knitting machine, two sets of needles and operating means therefor, pattern mechanism for controlling the operation of said needles to produce either ribbed, plain circular, or reciprocating work as desired linkers, and means for operating them to depress the web, additional means for producing tension on the fabric for casting off the stitches from the needles in action, automatically controlled to apply or vary said tension as required, pattern-controlled means for varying the amount of thread drawn off by the needles.

38. In a circular knitting machine, two sets of needles and operating means therefor, pattern mechanism for controlling the operation of said needles to produce either ribbed, plain circular, or reciprocating work as desired, and means for automatically varying the tension on the fabric during the knitting operation at predetermined times.

39. In a circular knitting machine, two sets of needles and operating means therefor, pattern mechanism for controlling the operation of said needles to produce either ribbed, plain circular, or reciprocating work as desired, and means automatically varying in operation during the various knitting operations for equalizing the tension on all sides of the fabric for casting off the stitches.

40. In a circular knitting machine, two sets of needles and operating means therefor, pattern mechanism for controlling the operation of said needles to produce either ribbed, plain circular, or reciprocating work as desired, means for automatically varying the tension on the fabric during the knitting operation at predetermined times, and means for automatically equalizing the tension on all sides of the fabric for casting off the stitches during the various knitting operations.

41. In a circular knitting machine, two sets of needles and operating means therefor, pattern mechanism for controlling the operation of said needles to produce either ribbed, plain circular, or reciprocating work as desired, means for automatically varying the tension on the fabric during the knitting operation at predetermined times, means for automatically equalizing the tension on all sides of the fabric for casting off the stitches during the various knitting operations, and means for automatically changing the threads during the knitting operation, as desired.

42. In a circular knitting machine, two sets of needles and operating means therefor, pattern mechanism for controlling the operation of said needles to produce either ribbed, plain circular, or reciprocating work as desired, means for automatically varying the tension on the fabric during the knitting operation at predetermined times, means for automatically equalizing the tension on all sides of the fabric for casting off the stitches during the various knitting operations, and pattern controlling means for varying the amount of thread drawn off by the needles.

43. In a circular knitting machine, two sets of needles and operating means therefor, pattern mechanism for controlling the operation of said needles to produce either ribbed, plain circular, or reciprocating work as desired, means to adjust the tension on the fabric during the knitting operations, and means for automatically changing the threads during the knitting operation, as desired.

44. In a circular knitting machine, two sets of needles and operating means therefor, pattern mechanism for controlling the operation of said needles to produce either ribbed, plain circular, or reciprocating work as desired, means to adjust the tension on the fabric during the knitting operations, and pattern controlled means for varying the amount of thread drawn off by the needles.

45. In a circular knitting machine, two sets of needles and operating means therefor, pattern mechanism for controlling the operation of said needles to produce either ribbed, plain circular, or reciprocating work as desired, means to adjust the tension on the fabric during the knitting operations, and means for automatically varying the speed of the machine at predetermined times, as required by the character of the work.

46. In a knitting machine, the combination of a driving shaft, two pulleys loosely mounted on the shaft, means for driving said pulleys at different speeds, a clutch splined to said shaft, a speed lever for moving said clutch, means for operating said speed lever, and devices under the control of a pattern for placing the speed lever in position to be acted upon by said means.

47. In a knitting machine, the combination of a driving shaft, means for moving the shaft at different speeds including a clutch, a speed lever for operating the clutch, a continuously moving means for operating the speed lever, a pattern surface, and devices under control of the pattern surface for bodily moving the speed lever into the path of its actuating means.

48. In a knitting machine, the combination of a driving shaft, means including a clutch for moving the shaft at different speeds, a speed lever for operating the clutch, said speed lever being provided with a pivoted switch or shoe near one end, means for acting alternately on opposite sides of said switch or shoe for moving said lever in opposite directions, and devices for placing said speed lever in position to have the shoe or switch acted upon by its actuating means.

49. In a knitting machine, the combination of a driving shaft, means including a clutch for moving the shaft at different speeds, a speed lever for operating the clutch, said speed lever being provided with a pivoted switch or shoe near one end, means for acting alternately on opposite sides of said switch or shoe for moving said lever in opposite directions, and pattern controlled devices for bodily moving said speed lever in position to have the switch or shoe acted upon by its actuating means.

50. In a knitting machine, the combination of a main pattern chain, a pawl and ratchet for moving said pattern chain step by step, a pawl controller for engaging said pawl, and means actuated by the main pattern chain to move the pawl controller to disengage the pawl from its ratchet, a controller lever having a part to contact with the pawl controller to free it from engagement with the pawl, and means for actuating the controller lever.

51. In a knitting machine, the combination of a main pattern chain, a continuously moving pawl, and a ratchet adapted to be engaged thereby to move the said pattern chain step-by-step a pawl controller having a projection and actuated from the main pattern chain for engaging said pawl and holding the same out of engagement with the ratchet, a controller pattern chain, and means actuated by said controller chain to trip the pawl controller and permit the pawl to engage the ratchet.

52. In a knitting machine, the combination of a main pattern chain, means to move said pattern chain step-by-step, devices under control of the main pattern chain to render said means inoperative to move the main pattern chain, a controller pattern chain, devices for continuously moving the same, and mechanism actuated by the controller chain for tripping said devices to free the said means.

53. In a knitting machine, the combination of a main pattern chain, means to move said pattern chain step-by-step, devices under control of the main pattern chain to render said means inoperative to move the pattern chain, a continuously moving controller pattern chain, and a trip lever operated by said controller chain to free the said means from said devices.

54. In a knitting machine, the combination of a cam cylinder, mechanism for rotating and reciprocating the same, a needle cylinder and its needles, a pattern surface provided with means to render a portion of the needles simultaneously inoperative, means for operating said pattern surface, devices under control of said pattern surface for rendering the said means inoperative, and instrumentalities for tripping said devices on change of motion of said cylinder.

55. In a knitting machine, the combination of a needle cylinder and its needles, a cam cylinder, a pattern cylinder having a bar for simultaneously rendering substantially one half of the needles inactive, means to rotate said cylinder comprising a ratchet and pawl, a pawl lifter under control of the pattern cylinder for rendering the pawl inoperative, a main pattern chain, and means under control of the main pattern chain for tripping the pawl lifter from engagement with the pawl.

56. In a knitting machine, the combination of a needle cylinder and its needles, a cam cylinder, a pattern cylinder having a bar for simultaneously rendering substantially one half of the needles inoperative, a ratchet wheel connected to said cylinder, a constantly operating pawl for turning said ratchet wheel and cylinder, a pawl lifter adapted to engage and lift the pawl from the ratchet wheel, said lifter being under control of the said pattern cylinder, a main pattern chain, means to move it, and devices under control of the main pattern chain for tripping the pawl lifter from engagement with the pawl.

57. In a knitting machine, the combination of a needle cylinder and its needles, a cam cylinder, rotary and reciprocating devices for rotating and reciprocating said cam cylinder, a clutch, a shifting lever for said clutch, means for actuating said lever to shift the clutch into engagement with either of said devices, said lever being normally out of operative engagement with said means, and mechanism to move said lever into engagement with its operating means.

58. In a knitting machine, the combination of a needle cylinder and its needles, a cam cylinder, rotary and reciprocating devices for rotating and reciprocating said cam cylinder, a clutch, a shifting lever for said clutch, means for actuating said lever to shift the clutch into engagement with either of said devices, said lever being normally out of operative engagement with said means, and pattern controlled mechanism to automatically move said lever into engagement with its operating means.

59. In a knitting machine, the combination of a needle cylinder and its needles, a cam cylinder, rotary and reciprocating devices, and means for rendering one or the other of said devices operative to rotate or reciprocate said cam cylinder, comprising a clutch, a shifting lever for moving said clutch, said lever being bodily movable lengthwise of its pivotal support, means for actuating said lever to shift the clutch, and pattern controlled means for moving the said lever into the path of movement of its operating means.

60. In a knitting machine, the combination of a needle cylinder and its needles, a cam cylinder, rotary and reciprocating devices, and means for rendering one or the other of said devices operative to rotate or reciprocate said cam cylinder, comprising a clutch, a shifting lever for moving said clutch, said lever carrying a switch, means to operate said lever, and devices for placing the said switch in the path of the lever operating means.

61. In a knitting machine, the combination of a needle cylinder and its needles, a cam cylinder, continuous rotary and reciprocating devices, a clutch for rendering one or the other of said devices operative to move the cam cylinder, a shifting lever for said clutch, means normally out of engagement with said lever for operating the same to move the clutch, and a pattern controlled radius bar for causing the engagement of the shifting lever with its actuating means.

62. In a knitting machine, the combination of a needle cylinder and its needles, a cam cylinder, rotary and reciprocating devices for said cam cylinder, a pattern cylinder having provisions for holding substantially one half the needles in inactive position during reciprocating knitting, means for turning said cylinder, instrumentalities for causing the reciprocating devices to become the driver of said cam cylinder, and an arm connected to said instrumentalities for rendering the pattern cylinder operating means inactive during reciprocating motion of the cam cylinder and means to shift the instrumentalities to cause the rotary devices to become the driver and simultaneously trip said arm from the pattern cylinder operating means.

63. In a knitting machine, the combination of a needle cylinder and its needles, a cam cylinder, rotary and reciprocating devices for said cam cylinder, a pattern cylinder having provisions for holding substantially one half the needles in inactive position during reciprocating knitting, means for turning said pattern cylinder, instrumentalities for causing the reciprocating devices to become the driver of said cam cylinder, an arm connected to said instrumentalities for rendering the pattern cylinder operating means inactive during reciprocating motion of the cam cylinder, a shifting lever for said instrumentalities, and means for moving said lever to shift the instrumentalities to cause the rotary devices to become the driver and to simultaneously trip the said arm from the pattern cylinder operating means.

64. In a knitting machine, a thread guide, a needle cylinder and its needles, a cam cylinder, a dial plate carrying dial needles, a dial cam plate having a continuous cam for operating said dial needles, means for locking the dial cam plate in position to cause the dial needles to reciprocate at a point removed from the thread guide so that they will not take thread, and pattern controlled devices to trip said locking means to permit the dial cam plate to assume such position with respect to the thread guide that the dial needles will take thread and knit.

65. In a knitting machine, a needle cylinder and its needles, a cam cylinder, means for rotating the latter for the production of tubular web and for reciprocating it for the production of a flat web, a dial plate and its needles, a dial cam plate having one cam path, means for connecting the dial cam plate to the cam cylinder to move in unison therewith in both its rotary and reciprocating motions, means for adjusting the dial cam plate with respect to the cam cylinder to cause the dial needles not to receive thread during plain knitting and for adjusting the dial cam plate to receive thread and knit in the production of ribbed work, a locking device for locking the dial cam plate in either of said adjusted positions, and means for tripping said locking device.

66. In a knitting machine, the combination of a needle cylinder and its needles, a cam cylinder, means for rotating and reciprocating said cam cylinder, devices for throwing substantially one half of the needles out of action at the commencement of reciprocating knitting, means for changing the thread in passing from rotary to reciprocating knitting and vice versa, means to change the length of stitch to accord with the size of thread introduced, a dial plate and needles, a dial cam plate, means for moving the dial cam plate with the cam cylinder during rotary and reciprocating knitting, devices for changing the position of said dial cam plate with respect to the cam cylinder to cause the dial needles not to receive thread during reciprocating knitting and to receive thread and knit during the formation of ribbed work, and means to change the thread when ribbed knitting is to be done.

67. In a knitting machine for the production of a stocking having a plain foot portion and a ribbed leg, the combination of a needle cylinder and its needles, a cam cylinder, means for rotating and reciprocating said cam cylinder at different speeds, means for changing the thread in passing from plain rotary to reciprocating knitting and vice versa, a dial plate and its needles, a dial cam plate, means for rendering the dial needles active during rotary knitting to form a ribbed leg, devices for changing the thread at the time the dial needles are rendered so active, and means for changing the length of stitch to accord with the size of thread introduced to the needles.

68. In a knitting machine, the combination of a thread guide, a dial plate carrying needles, a dial cam plate, means to move the latter with respect to the dial plate to operate the dial needles, a locking pin to lock the dial cam plate to its actuating means, a trip for said pin under control of a pattern to disengage said locking pin from the dial cam plate to permit the latter to remain stationary for a part of a revolution to change the operative relation of the dial needles with respect to the thread guides and to then engage said pin with the dial cam plate.

69. In a knitting machine, a series of cylinder needles having tails provided with notches, a series of levers normally disengaged from said needles, a pattern cylinder having a projection, devices for moving said cylinder, and jacks actuated by said projection to simultaneously move all the needles which are not to be used in knitting toes and heels, to thereby put and maintain all said needles in their inactive positions during the knitting of toes and heels.

70. In a knitting machine, a series of cylinder needles having tails provided with notches, a series of levers normally disengaged from said needles, a cylinder having a projection, means to move said cylinder, and jacks having hook connection with said levers and actuated by said projection to simultaneously move all the needles which are not to be used in knitting toes and heels, to thereby put said needles in their inactive positions during the knitting of toes and heels, a pattern surface, and means carried thereby and acting through the jacks to put said levers into operating position to engage and actuate at proper times the needles used in narrowing and widening.

71. A needle cylinder containing needles, a cam cylinder having a cam for moving said needles, a thread guide to supply said needles with thread, means to reciprocate said cam cylinder for moving some of the needles for narrowing and widening in the production of a heel or toe pouch, means to rotate said cam cylinder after the completion of the heel or toe pouch, a second thread guide containing a finer thread, means to shorten the stitch made by the cylinder needles, and a dial needle plate carrying dial needles, a dial cam plate and means to operate it while the cam cylinder is rotated to knit a leg in rib stitch, the leg being started with the shorter stitches to avoid gaps in the knitting at the commencement of the leg.

72. In a knitting machine, the combination of a needle cylinder and needles, a cam cylinder having needle operating means, means for rotating and reciprocating one of said cylinders, a main pattern chain for controlling the length of stitch, the speed of the machine, and change from rotary to reciprocating knitting and back again, means to move the pattern chain step-by-step, devices under control of the main pattern chain for rendering said means inoperative to move the main pattern chain, and constantly actuated mechanism for tripping said devices to free the said means.

73. In a knitting machine, the combination of a main pattern chain, means to move said chain step-by-step, a lever having a finger adapted to be engaged by a riser on the main pattern chain, a pawl controller supported by said lever and having a projection to engage and render inoperative said means, and a constantly operating controller pattern chain for tripping the pawl controller from engagement with the means for moving the main pattern chain.

74. In a knitting machine, the combination of a main pattern chain, a pawl for moving said pattern chain step-by-step, a lever, a pawl controller pivotally mounted upon said lever to engage beneath the pawl, a finger projecting from said lever to engage a riser on the main pattern chain and lift the lever and pawl controller to render the pawl inoperative, and pattern controlled means for tripping the pawl controller and permitting the pawl to operate the main pattern chain.

75. In a knitting machine, a latch opener comprising a pivoted arm having bristles at one end and means for moving the same toward and from the needles during reciprocating knitting.

76. In a knitting machine, the combination of a cam cylinder, a needle cylinder and its needles, means for reciprocating said cam cylinder, a thread guide stand and its thread guide, a latch opener pivoted on said stand, and having a slotted end, and a pin on the cam cylinder in engagement with said slotted end of the latch opener to move the other end thereof towards and from the needles.

77. In a knitting machine, a needle cylinder and its needles, a cam cylinder, means for rotating and reciprocating said cam cylinder, a series of needle jacks arranged in line, levers to engage the needles and controlled by said jacks, and means for simultaneously acting on said line of jacks to place the needles controlled by them into and out of action; another series of needle jacks arranged in line, levers to engage the needles and controlled by said jacks, and means for acting on said row of jacks to successively render inactive the needles at the ends of the series controlled by them and to then successively return said needles into action.

78. In a knitting machine, the combination of a needle cylinder and its needles, a cam cylinder and means for rotating and reciprocating said cam cylinder at different speeds, a dial plate and its needles, a dial cam plate, means for locking the latter to move with the cam cylinder and in position to render the dial needles functionally inoperative during reciprocating knitting and to return and lock it in functionally operative position to form ribbed work, thread guides, and means to operate them to effect a change of thread prior to the commencement of ribbed knitting, a stitch changing device, and means to change the length of stitch to accord with the size of thread used in rib knitting and to thereafter change the length of stitch in different portions of the ribbed work.

79. In combination, a driving wheel, a pivoted pawl driven from said driving wheel, a ratchet which said pawl operates, a wheel driven by said ratchet wheel, a lever normally holding said pawl out of action, a second pawl driven from said driving wheel, a ratchet which said pawl drives, a cam normally out of contact with said second pawl, a pattern chain driven by said last mentioned ratchet, said pattern chain having a lug adapted to release the first mentioned lever from its pawl, and a lug adapted to move the cam into engagement with its pawl and move said pawl out of action.

80. In a rib knitting machine, the combination with the needle cylinder and its needles, of a movably mounted needle operating cam, a take-up for the fabric being knit, and automatic means for moving the cam to change the length of stitch and for throwing the take-up into or out of operation as desired at the same time.

81. A knitting machine comprising in combination a rib knitting mechanism including a movably-mounted needle operating cam for the cylinder needles, a take-up for the fabric being knit, and means for moving the said cam and for throwing the take-up out of operation.

82. In a knitting machine, the combination of a take-up for the fabric being knit, a pattern surface, means under control of the pattern surface for lifting the take-up to relieve the stress upon the needles.

83. In a knitting machine, the combination of a take-up for the fabric being knit, a weight connected with said take-up, a pattern surface, means under control of the pattern surface for lifting the weight from the take-up as desired, means under control of the pattern surface for lifting the take-up and weight as desired.

84. In a knitting machine, the combination of a take-up for the fabric being knit, a weight connected with said take-up, a pattern surface, means under control of the pattern surface for lifting the weight from the take-up as desired, means under control of the pattern surface for lifting the take-up and weight as desired, a handle projecting from said take-up whereby the take-up may be raised by hand.

85. In a knitting machine, the combination of a take-up comprising a yoke frame pivotally mounted upon the machine frame and normally suspended by the fabric being knit, a weight suspended from said frame, automatic devices to lift the frame when desired.

86. In a knitting machine, the combination of a take-up comprising a yoke frame pivotally mounted on the machine frame and normally suspended by the fabric being knit, a weight suspended from said frame, automatic devices to lift the frame while reciprocating knitting is being done.

87. In a knitting machine, the combination of a take-up comprising a yoke frame pivotally mounted on the machine frame and normally suspended by the fabric being knit, a weight suspended from said frame, automatic devices to lift the weight when desired, and automatic devices to lift the entire yoke and weight when desired.

88. In a knitting machine, a take-up comprising a positively driven feed roll, a second roll yieldingly pressed against the first roll, a yoke frame pivoted on the axis of the driven roll and carrying at its forward end an idler roll under which the knitted fabric passes before entering the bight of the feed rolls.

89. In a knitting machine, a take-up comprising a positively driven feed roll, a second roll yieldingly pressed against the first roll, a yoke frame pivoted on the axis of the driven roll, and suspended at its forward end by the fabric being knit, and automatic devices to lift the yoke frame when desired.

90. In a knitting machine, a take-up comprising a positively driven feed roll, a second roll yieldingly pressed against the first roll, a yoke frame pivoted on the axis of the driven roll, and suspended at its forward end by the fabric being knit, a weight suspended from said yoke frame, automatic means to lift the yoke frame and weight when desired, and automatic devices to lift the weight alone when desired whereby varying stress may be placed on the needles.

91. In a knitting machine, the combination of a take-up for the fabric being knit, a pattern surface, means under the control of the pattern surface for lifting the take-up to relieve the stress upon the needles when desired, and means operated upon the release of the take-up by the fabric running off the needles to stop the machine.

92. In a knitting machine, the combination of a take-up comprising a yoke frame normally suspended by the fabric being knit, automatic devices to lift the frame when desired, means operated by the falling of the yoke frame when the fabric runs off the needles to stop the machine.

93. In a knitting machine for making plain and ribbed work, means for taking up the web being knit, and thus producing tension on the needles, pattern-controlled means operative just prior to the beginning of ribbed knitting for increasing the tension on the needles and at the same time for securing a substantially uniform tension throughout the web.

94. In a knitting machine for making plain and ribbed work, a grab adapted to be raised and lowered within the needle cylinder, pattern-controlled devices for raising said grab and releasing it just prior to the beginning of ribbed knitting in order to secure a substantially uniform tension throughout the web.

95. In a knitting machine for making plain and ribbed work, a grab adapted to be raised and lowered within the needle cylinder, a weight connected to said grab, pattern controlled devices for raising said grab and releasing it just prior to the beginning of ribbed knitting in order to secure a substantially uniform tension throughout the web.

96. In a knitting machine for making plain and ribbed work, a grab extending within the needle cylinder, a weight normally tending to depress said grab, a lever pivotally mounted on the machine frame and loosely connected to the grab, a pattern surface, projections on said pattern surface acting on said lever to raise said grab and release it just prior to the beginning of ribbed knitting in order to secure a substantially uniform tension throughout the web.

97. In a knitting machine, the combination of a take-up normally suspended on the fabric being knit, automatic devices for releasing said take-up, a grab extending within the needle cylinder, automatic devices for raising the grab into engagement with the fabric when desired.

98. In a knitting machine, the combination of a take-up comprising a yoke frame normally suspended by the fabric being knit, a grab extending up within the needle cylinder and normally depressed, pattern controlled devices for relieving the fabric of the weight of the take-up and for raising the grab into engagement with the fabric when desired.

99. In a knitting machine, the combination of a take-up comprising a yoke frame normally suspended by the fabric being knit, a grab extending up within the needle cylinder, and normally depressed, a pattern surface, means under the control of the pattern surface for lifting the take-up to relieve the fabric of weight during reciprocating knitting, means under control of the pattern surface for raising the grab into engagement with the fabric when desired.

100. In a rib knitting machine, the combination with the dial and cylinder, their needles and operative devices, of a tension device for the knitted web, means for throwing the dial needles out of operation and means for releasing the web from the tension, substantially as described.

101. The combination with the tension device, of the rod and cam for lifting it out of operative position, substantially as described.

102. The combination with a rib knitting machine, and a web tension device, of automatic devices for releasing the web from tension, substantially as described.

103. In a rib knitting machine, the combination of the dial and cylinder, their needles and operative devices, of means for taking up the knitted web, and means adapted to seize the knitted web just prior to the throwing into action of the dial needles to produce ribbed work to secure substantially uniform tension throughout the web.

104. In a knitting machine, the combination of the take-up for the fabric being knit, a weight connected with the said take-up, a grab, means for automatically throwing into and out of operation either of the three said devices when desired.

105. In a rib knitting machine, the combination of the dial and cylinder, their needles and operative devices, of a take-up for the fabric being knit, a weight connected with the said take-up, a grab, means for automatically throwing into and out of operation either of the three said devices when desired.

106. In a rib knitting machine, the combination with the dial and cylinder, their needles and operative devices, a grab to catch the knitted web and produce tension thereon, a rod carrying said grab, a guide for said rod arranged parallel with the axis of the needle cylinder and in line with but entirely outside of the interior thereof, automatic mechanism for raising said rod and dropping it into engagement with the knitted web just prior to the beginning of ribbed work.

107. In a rib knitting machine, the combination with the dial and cylinder, their needles and operative devices, a grab to catch the knitted web and produce tension thereon, a rod carrying said grab, a guide for said rod supported from the framework of the machine located outside of the cylinder and arranged to guide the grab within the cylinder and in a direction parallel with its axis.

108. In a knitting machine, the combination with a take-up for the knitted fabric, of a pattern mechanism, and means connected with the pattern mechanism for releasing the fabric from the tension of the said take-up, substantially as described.

109. In a knitting machine, the combination with a take-up for the knitted fabric, of a pattern mechanism, and means operatively connected with the pattern mechanism for moving the take-up to release the fabric from the take-up tension, thereby releasing the needles from strain.

In testimony whereof, we have signed our names to this specification, in the presence of two subscribing witnesses.

WARREN D. HUSE.
LEON C. HUSE.

Witnesses:
EDMUND LITTLE,
OSCAR J. GEORGE.

Corrections in Reissue Letters Patent No. 12,917.

It is hereby certified that in Reissue Letters Patent No. 12,917, granted February 9, 1909, upon the application of Warren D. Huse and Leon C. Huse, of Laconia, New Hampshire, for an improvement in "Knitting-Machines," errors appear in the printed specification requiring correction, as follows: In line 32, page 3, after the word "bars," the following should be inserted: *by suitable bolts* $A^5$, *Fig. 2. The cross bars;* line 61, page 9, the reference character "$d^6$" should read $d^8$; line 96, same page, the word "provied" should read *provide;* line 77, page 15, the word "pines" should read *pins;* line 2, page 16, after the word "holder," the word *ring* should be inserted, and in line 95, page 25, after the word "said," the word *main* should be inserted; and that the said Letters Patent should be read with these corrections therein that the same may conform to the record of the case in the Patent Office.

Signed and sealed this 23d day of February, A. D., 1909.

[SEAL.]

C. C. BILLINGS,
*Acting Commissioner of Patents.*